(12) United States Patent
Kato et al.

(10) Patent No.: US 7,778,518 B2
(45) Date of Patent: *Aug. 17, 2010

(54) TRANSPORT STREAM RECORDING APPARATUS AND METHOD, TRANSPORT STREAM REPRODUCING APPARATUS AND METHOD, AND PROGRAM RECORDING MEDIUM

(75) Inventors: Motoki Kato, Kanagawa (JP); Toshiya Hamada, Saitama (JP); Kenji Ogawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1732 days.

This patent is subject to a terminal disclaimer.

(21) Appl. No.: 10/774,381

(22) Filed: Feb. 10, 2004

(65) Prior Publication Data
US 2004/0156623 A1 Aug. 12, 2004

Related U.S. Application Data

(62) Division of application No. 09/668,438, filed on Sep. 22, 2000, now Pat. No. 6,950,604.

(30) Foreign Application Priority Data
Sep. 29, 1999 (JP) ............................. 11-275837

(51) Int. Cl.
*H04N 5/91* (2006.01)
(52) U.S. Cl. ........................................ 386/46; 725/135
(58) Field of Classification Search ................. 386/46, 386/95, 98, 125; 725/91, 93, 94, 100, 105, 725/135
See application file for complete search history.

(56) References Cited

U.S. PATENT DOCUMENTS

| | | | | |
|---|---|---|---|---|
| 5,684,768 | A | * | 11/1997 | Terasaki et al. ........... 369/47.21 |
| 6,738,427 | B2 | * | 5/2004 | Zetts ....................... 375/240.28 |
| 6,856,759 | B1 | * | 2/2005 | Fukuda et al. ................. 386/96 |
| 2004/0047612 | A1 | * | 3/2004 | Nagata et al. .................. 386/98 |

FOREIGN PATENT DOCUMENTS

| | | |
|---|---|---|
| AR | 9-186968 | 7/1997 |
| EP | 0 737 008 A2 | 10/1996 |
| EP | 0 897 178 A2 | 2/1999 |
| EP | 0 917 355 A1 | 5/1999 |
| EP | 0 930 782 A1 | 7/1999 |
| EP | 1 122 728 A1 | 8/2001 |
| JP | 8-235832 | 9/1996 |
| JP | 8-339630 | 12/1996 |
| JP | 9-139915 | 5/1997 |
| JP | 11-96730 | 4/1999 |
| JP | 11-112452 | 4/1999 |
| WO | WO 98/17024 | 4/1998 |
| WO | WO 99/16196 | 4/1999 |

* cited by examiner

*Primary Examiner*—Thai Tran
*Assistant Examiner*—Mishawn Dunn
(74) *Attorney, Agent, or Firm*—Oblon, Spivak, McClelland, Maier & Neustadt, L.L.P.

(57) ABSTRACT

Random access reproduction in prompt response to user commands is realized. A stream analyzing block analyzes sequentially inputted transport streams to get entry point data. Discontinuity point data are obtained in correspondence to a discontinuity occurrence flag inputted from a PLL block. Sequentially inputted transport packets are analyzed to get mark point data. A stream database creating block creates a stream database by use of the discontinuity point data and the mark point data. The stream database is recorded on a recording medium.

12 Claims, 25 Drawing Sheets

F I G. 4
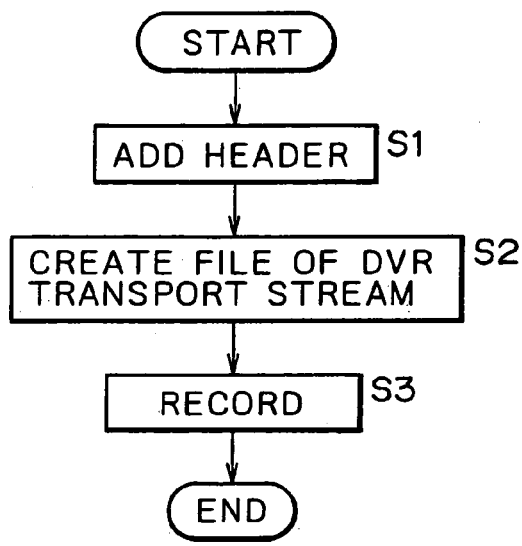
F I G. 5
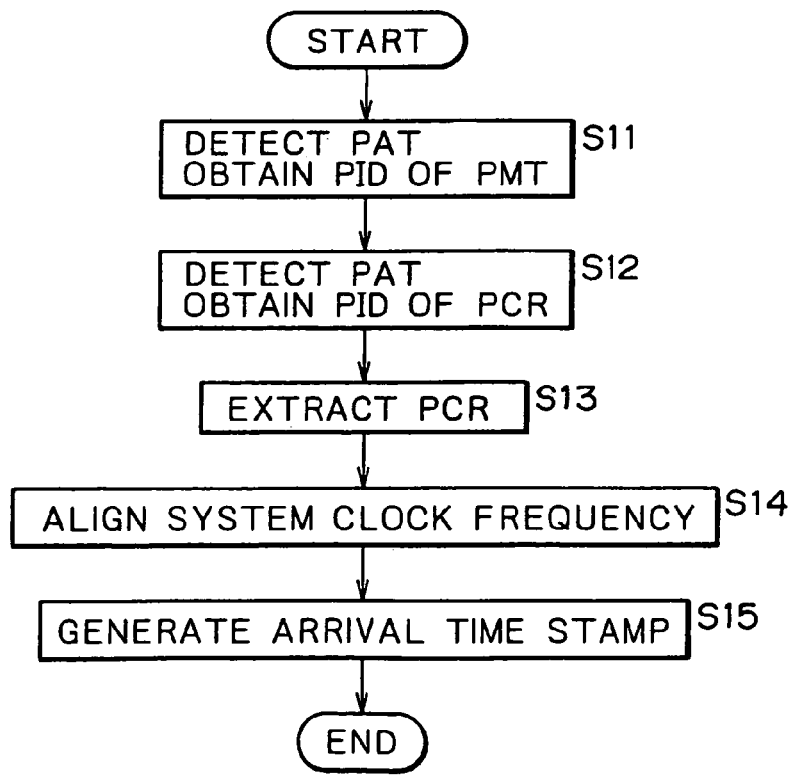

FIG.12

| video_PID | |
|---|---|
| offset_source_packet_number | |
| PTS OF ENTRY POINT (PTS_EP_start) | ADDRESS OF ENTRY POINT (RSPN_EP_start) |
| x 1 1 | E 1 1 |
| x 1 2 | E 1 2 |
| x 2 1 | E 2 1 |
| x 2 2 | E 2 2 |

ENTRY POINT MAP

F I G 13

| STC TIME AXIS ID (STC_sequence_id) | PCR_PID | start_PCR_value | end_STC_value | RSPN_STC_start |
|---|---|---|---|---|
| #1 | X | start_PCR1 | end_stc1 | A1 |
| #2 | Y | start_PCR2 | end_stc2 | A2 |

STC TIME AXIS INFORMATION

FIG.14

| Syntax | No. of bits |
|---|---|
| STC_Info() { | |
| length | 3 2 |
| num_of_STC_sequence | 8 |
| for(i=0 ; i<num_of_STC_sequence ; i++) { | |
| STC_sequence_id | 1 6 |
| PCR_PID | 1 6 |
| RSPN_STC_start | 3 2 |
| reserved | 3 1 |
| start_PCR_value | 3 3 |
| reserved | 3 1 |
| end_stc_value | 3 3 |
| } | |
| } | |

FIG.15

| Syntax | No. of bits |
|---|---|
| STC_Info() { | |
|    version_number | 8 * 4 |
|    Length | 3 2 |
|    if (length !=0) { | |
|       num_of_STC_sequence | 8 |
|       offset_STC_sequence_id | 8 |
|       for (STC_sequence_id=offset_STC_sequence_id ;<br>           STC_sequence_id< (num_of_STC_sequence+<br>offset_STC_sequence_id) ;<br>           STC_sequence_id++) { | |
|          RSPN_STC_start | 3 2 |
|          start_PTS | 6 4 |
|          end_PTS | 6 4 |
|       } | |
|    } | |
| } | |

FIG.16

| Syntax | No. of bits |
|---|---|
| ProgramInfo() { | 3 2 |
|     length | 1 6 |
|     number_of_PSI_SI_change | |
|     for(i=0 ; i<number_of_PSI_SI_change ; i++) { | |
|         PSI_SI_type | 8 |
|         if (PSI_SI_type==PAT) { | |
|             start_PAT_address | 3 2 |
|         } | |
|         else if (PSI_SI_type==PMT) { | |
|             program_map_PID | 1 6 |
|             start_PMT_address | 3 2 |
|             program_number | 1 6 |
|             PCR_PID | 1 6 |
|             number_of_videos | 8 |
|             number_of_audios | 8 |
|             for (k=0 ; k<number_of_videos ; k++) { | |
|                 video_PID | 1 6 |
|                 VideoCodingInfo() | |
|             } | |
|             for (k=0 ; k<number_of_audios ; k++) { | |
|                 audio_PID | 1 6 |
|                 audioCodingInfo() | |
|             } | |
|         } | |
|         else if (PSI_SI_type==SIT) { | |
|             start_SIT_address | 3 2 |
|         } | |
|     } | |
| } | |

FIG.17

| Syntax | No. of bits |
|---|---|
| ProgramInfo() { | |
|     version_number | 8 * 4 |
|     Length | 32 |
|     if(length !=0) { | |
|         Reserved | 8 |
|         Number_of_program_sequence | 8 |
|         for (i=0 ; i<number_of_program_sequence ; i++) { | |
|             RSPN_program_sequence_start | 32 |
|             reserved | 32 |
|             program_map_PID | 16 |
|             PCR_PID | 16 |
|             number_of_videos | 8 |
|             number_of_audios | 8 |
|             for (k=0 ; k<number_of_videos ; k++) { | |
|                 video_stream_PID | 16 |
|                 VideoCodingInfo() | |
|             } | |
|             for (k=0 ; k<number_of_audios ; k++) { | |
|                 audio_stream_PID | 16 |
|                 AudioCodingInfo() | |
|             } | |
|         } | |
|     } | |
| } | |

ProgramInfo − Syntax

FIG. 19

| Syntax | No. of bits |
|---|---|
| EntryPointMap() { | |
| length | 32 |
| offset_source_packet_number | 32 |
| number_of_video_streams | 16 |
| for (i=0 ; i<number_of_video_streams ; i++) { | |
| reserved | 3 |
| video_PID | 13 |
| number_of_entry_points | 32 |
| for(j=0 ; j<number_of_entry_point ; j++) { | |
| PTS_EP_start | 32 |
| RSPN_EP_start | 32 |
| } | |
| } | |
| } | |

FIG. 20

| Syntax | No. of bits |
|---|---|
| ClipMark() { | |
| version_number | 8*4 |
| Length | 32 |
| number_of_Clip_marks | 16 |
| for (i=0 ; i<number_of_Clip_marks ; i++) { | |
| Reserved | 8 |
| Mark_type | 8 |
| Mark_time_stamp | 32 |
| STC_sequence_id | 8 |
| Reserved | 24 |
| } | |
| } | |

Mark − SYNTAX

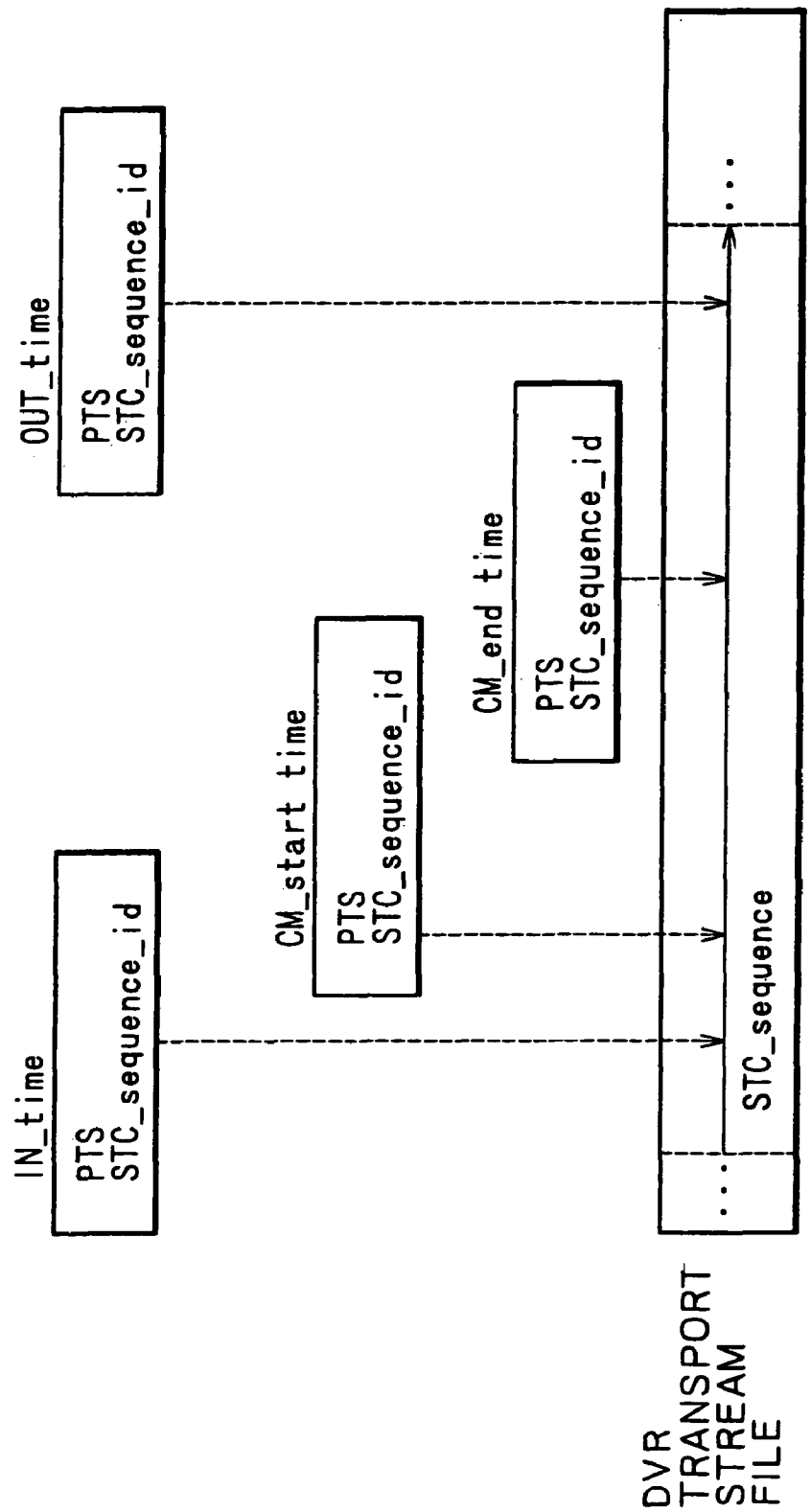

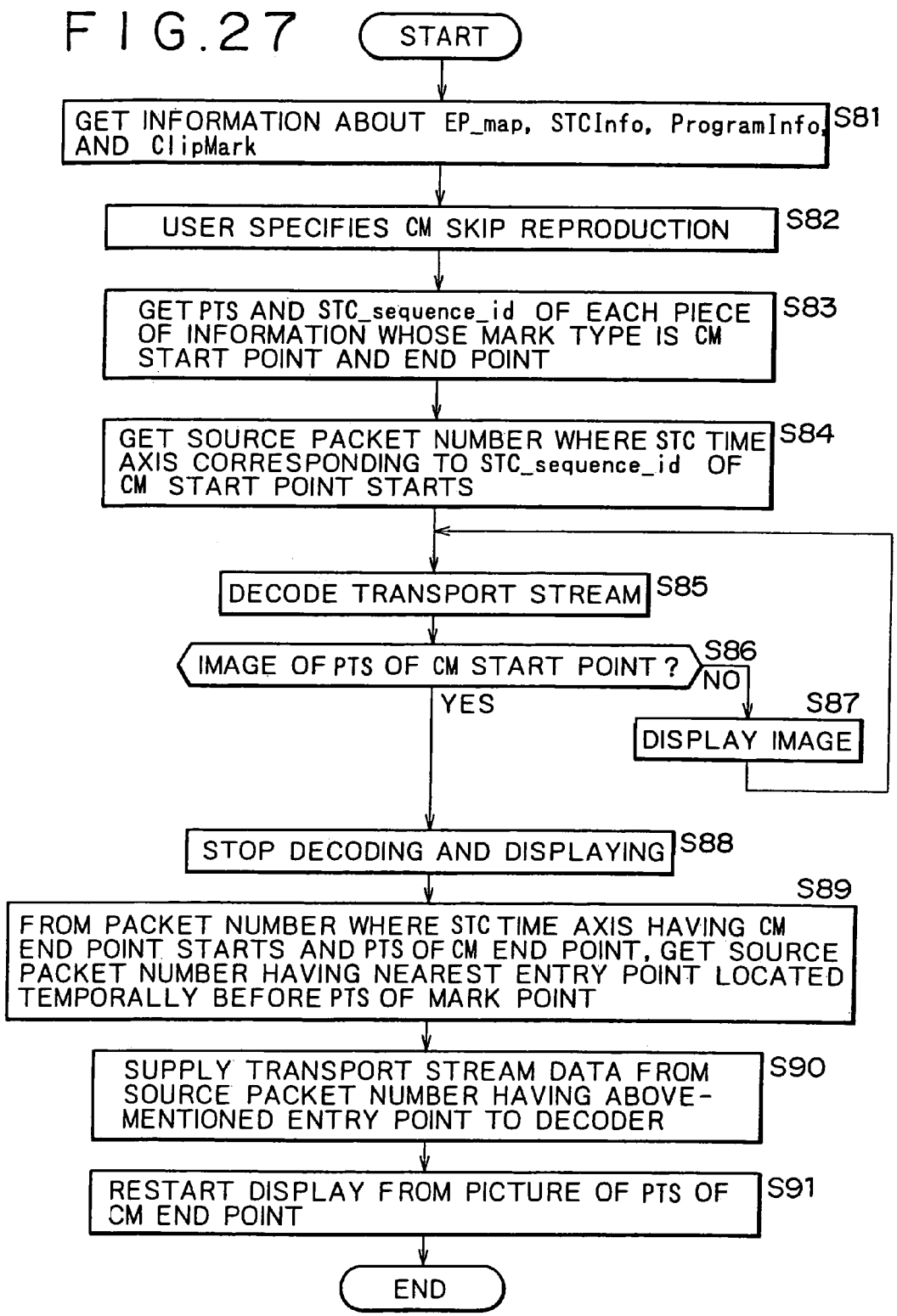

TRANSPORT STREAM RECORDING APPARATUS AND METHOD, TRANSPORT STREAM REPRODUCING APPARATUS AND METHOD, AND PROGRAM RECORDING MEDIUM

BACKGROUND OF THE INVENTION

The present invention generally relates to a transport stream recording apparatus and a transport stream recording method, a transport stream reproducing apparatus and a transport stream reproducing method, and a program recording medium. For example, the present invention relates to a transport stream recording apparatus and a transport stream recording method, a transport stream reproducing apparatus and a transport stream reproducing method, and a program recording medium which are suitably for use in recording an MPEG video stream for example onto a data recording medium so that the recorded video stream can be reproduced in random access manner and in reproducing the MPEG video stream.

MPEG (Moving Picture Experts Group) 2 transport streams are used in the satellite digital broadcast and terrestrial digital broadcast in Japan, Europe, and the US. Namely, transport streams as digital broadcast waves are multiplexed in a time division manner with packetized MPEG video and audio streams corresponding to the video and audio signals of broadcast programs.

If these transport streams can be recorded in the form of digital signals on the side of receivers, users can repeatedly view programs without degradation in picture and sound qualities.

Further, recording transport streams onto random-accessible recording medium such as a hard disc and an optical disc can realize random access reproduction in which broadcast programs can be reproduced from any point of time specified by user.

In an MPEG video stream, I picture, B picture, and P picture are arranged appropriately. The decoding of B picture and P picture uses the image data decoded in the past, so that only I picture can become the reproduction start position of these three types of pictures. Therefore, when random access reproduction is executed from a user-specified reproduction start position, the I picture which is nearest the specified reproduction start position is searched and the reproduction is started with that I picture.

However, to search for the I picture nearest the specified reproduction start position from a recorded transport stream, MPEG video packets must be extracted from the transport stream to analyze the header and payload of each MPEG packet. These extraction and analysis take time, thereby presenting a problem that prompt random access reproduction in response to user specification cannot be realized.

SUMMARY OF THE INVENTION

It is therefore an object of the present invention to realize prompt random access reproduction in response to user commands by detecting I picture in a transport stream to be recorded and by recording on a data recording medium information for identifying a packet in which data of the I picture are stored along with discontinuity information as a database of transport stream.

In carrying out the invention and according to a first aspect thereof, there is provided a transport stream recording apparatus for recording a transport stream on a recording medium, including a detector for detecting, from a transport packet constituting the transport stream, a discontinuity point in the transport stream, a discontinuity point information generator for generating discontinuity point information in accordance with the discontinuity point, and a recording unit for recording the transport packet onto the recording medium along with the discontinuity point information.

According to a second aspect of the invention, there is provided a transport stream recording apparatus, wherein the detector including a first extracting block for extracting reference time information located in the transport stream, a time information generator for generating system time information on the basis of the reference time information, and a time discontinuity detector for detecting occurrence of discontinuity in the reference time information.

According to a third aspect of the invention, there is provided a transport stream recording apparatus, wherein the discontinuity point information generator generates, as the discontinuity information, time axis identification information for identifying a time axis and positional information corresponding to a start time of the time axis.

According to a fourth aspect of the invention, there is provided a transport stream recording apparatus, wherein the discontinuity point information generator generates, as the time axis identification information, the system time information corresponding to a start time of the time axis and the system time information corresponding to an end time of the time axis.

According to a fifth aspect of the invention, there is provided a transport stream recording apparatus, wherein the discontinuity point information generator generates, as the time axis identification information, the system time information corresponding to a display start time on the time axis and the system time information corresponding to a display end time on the time axis.

According to a sixth aspect of the invention, there is provided a transport stream recording apparatus, wherein the detector including a second extracting block for extracting, on the basis of program information arranged in the transport stream, a point at which program content changes.

According to a seventh aspect of the invention, there is provided a transport stream recording apparatus further including a first analyzer for extracting, from the transport packets, a transport packet including data that may provide a reproduction start position, and an entry point map generator for generating an entry point map for identifying the transport packet including the data, wherein the recording unit records, along with the discontinuity point information, the entry point map on the recording medium as the database corresponding to the transport stream.

The above-mentioned first analyzer can be adapted to extract a transport packet in which I picture data are described as a transport packet in which data that can provide a reproduction start position are described. The above-mentioned entry point map creating block can be adapted to create an entry point map by use of the positional information about a transport packet in which I picture data are described and by use of I picture PTS.

According to an eighth aspect of the invention, there is provided a transport stream recording apparatus further including a second analyzer for extracting a transport packet including data that provide a mark point from the transport packets, and a mark point information generator for generating mark point information for identifying the transport packet including the data that provide the mark point, wherein the recording unit records the mark point information on the recording medium as the database corresponding to the transport stream along with the discontinuity point information.

According to a ninth aspect of the invention, there is provided a transport stream recording apparatus, wherein the mark point information generator generates the mark point information by use of time information of the mark point and time axis identification information for identifying a time axis to which the time information belongs.

According to a tenth aspect of the invention, there is provided a transport stream recording method for recording a transport stream on a recording medium, including the steps of detecting, from a transport packet constituting the transport stream, a discontinuity point in the transport stream, generating discontinuity point information in accordance with the discontinuity point, and recording the transport packet onto the recording medium along with the discontinuity point information.

According to an eleventh aspect of the invention, there is provided a program recording medium recording a computer-readable program for recording an inputted transport stream on a data recording medium, the program including the steps of detecting, from a transport packet constituting the transport stream, a discontinuity point in the transport stream, generating discontinuity point information in accordance with the discontinuity point, and recording the transport packet onto the recording medium along with the discontinuity point information.

According to a twelfth aspect of the invention, there is provided a transport stream reproducing apparatus for reproducing a transport stream recorded on a recording medium, including a reproducing unit for reproducing the transport stream from the recording medium, a reproduction controller for executing control such that time axis identification information of the transport stream and an entry point map are reproduced from the recording medium, and a controller for searching the time axis identification information and the entry point map for a reproduction start position, wherein the reproduction controller controls the reproducing unit such that the recording medium is read in accordance with the reproduction start position.

According to a thirteenth aspect of the invention, there is provided a transport stream reproducing method for reproducing a transport stream from a recording medium, including the steps of reproducing time axis identification information of the transport stream and an entry point map from the recording medium, searching the time axis identification information and the entry point map for a reproduction start position; and reading the recording medium in accordance with the reproduction start position.

According to a fourteenth aspect of the invention, there is provided a program recording medium recording a computer-readable program for reproducing a transport stream from a recording medium, the program including the steps of reproducing time axis identification information of the transport stream and an entry point map from the recording medium, searching the time axis identification information and the entry point map for a reproduction start position, and reading the recording medium in accordance with the reproduction start position.

In the transport stream recording apparatus and method and in the program recorded on the first program recording medium according to the invention, the transport packet is analyzed for detection of a discontinuity point in coding information and, in accordance with the analysis result, discontinuity point information in the case where discontinuity occurred is created. In addition, transport packet data are recorded on a data recording medium and the discontinuity point information is recorded on the data recording medium as a database corresponding to the transport stream.

In the transport stream recording apparatus and method and in the program recorded on the second program recording medium according to the invention, the database corresponding to a transport stream is obtained from a data recording medium. In addition, a specified reproduction start position is compared with information contained in the database corresponding to the transport stream to find a reproduction start permitting position. By use of the information contained in the database, an address on the data recording medium on which the transport packet corresponding to the reproduction start permitting position is computed. The reading of the transport packet starts from the computed address on the data recording medium.

BRIEF DESCRIPTION OF THE DRAWINGS

These and other objects of the invention will be seen by reference to the description, taken in connection with the accompanying drawing, in which:

FIG. 4 is a flowchart describing transport stream recording processing by a recording apparatus;

FIG. 5 is a flowchart describing a process in which an arrival time stamp is generated;

FIG. 12 is a diagram illustrating one example of entry point map;

FIG. 13 is a diagram illustrating one example of STC time axis information;

FIG. 14 is a diagram illustrating a first example of STC discontinuity information syntax;

FIG. 15 is a diagram illustrating a second example of STC discontinuity information syntax;

FIG. 16 is a diagram illustrating a first example of program sequence syntax;

FIG. 17 is a diagram illustrating a second example of program sequence syntax;

FIG. 19 is a diagram illustrating entry point map syntax;

FIG. 20 is a diagram illustrating mark syntax;

FIG. 21 is a diagram illustrating an example in which mark is indicated by STC_sequence_id and PTS values;

FIG. 27 is a flowchart describing CM skipped reproduction processing by use of mark point information.

DETAILED DESCRIPTION OF PREFERRED EMBODIMENTS

Figure 1:
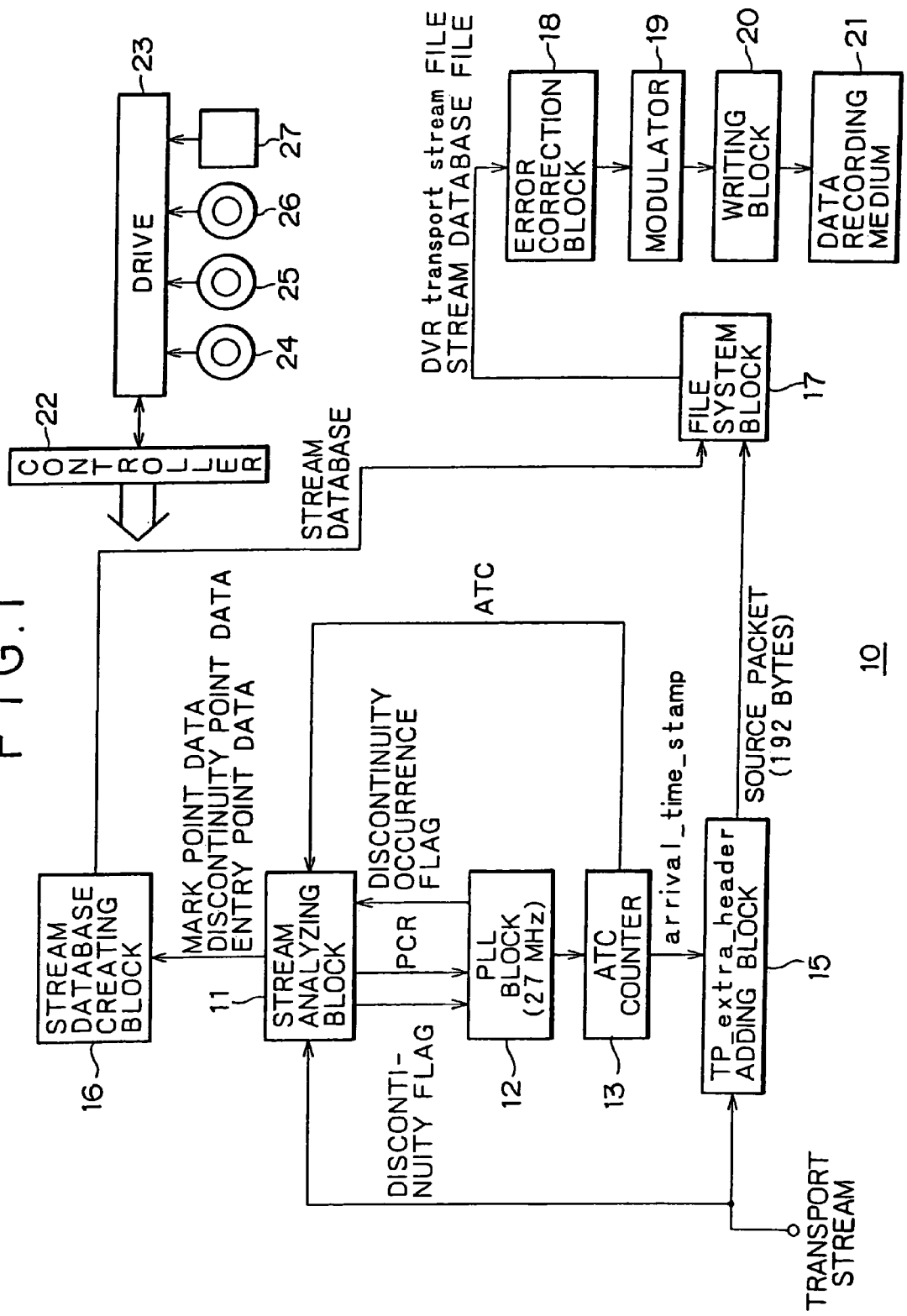
FIG. 1 is a block diagram illustrating a configuration of a recording apparatus practiced as one embodiment of the invention.

This invention will be described in further detail by way of example with reference to the accompanying drawings.

Now, referring to FIG. 1, an exemplary configuration of a recording apparatus 10 to which the present invention is applied will be described. The recording apparatus 10 adds a transport packet extra header to a transport packet (an MPEG video packet or an MPEG audio packet for example) as shown in FIG. 2A multiplexed at irregular intervals on a transport stream inputted from a set top box for example, not shown, which receives digital broadcast waves, thereby generating a source packet as shown in FIG. 2B to generate DVR transport stream by removing the intervals of the source packet. The generated DVR transport stream is then recorded on a data recording medium 21. It should be noted that the lateral axes in FIGS. 2A and 2B represent time axes for the arrival time clock at which the transport packet arrives at the recording apparatus 10.

A stream analyzing block 11 searches the transport packets sequentially inputted from the set top box for example for a packet in which PCR (Program Clock Reference) is stored, extracts PCR, and outputs it to a PLL (Phase Locked Loop) block 12.

The packets in which PCR is stored (these packets hereafter referred to as PCR packets) are arranged in a transport stream at intervals less than 100 milliseconds. PCR is information for aligning a system time clock (hereafter STC) that provides a reference clock for reproduction of data stored in each transport packet. PCR has a precision of 27 MHz. It should be noted that a difference between the values of the PCRs stored in one PCR packet and the following PCR packet is normally in proportion to the interval (less than 100 milliseconds) at which the PCR packets are arranged. However, for various reasons, the difference value between the PCRs stored in one PCR packet and the following PCR packet may be greater than the normal level. In such a case, the STC generated by the PLL block 12 (to be described later) becomes discontinuous, changing the STC time axis before and after the time at which the discontinuity occurs.

The stream analyzing block 11 also generates a discontinuity flag and outputs it to the PLL block 12 if STC discontinuity is found by the analysis of the header of each inputted transport packet; to be more specific, if a packet ID change in a PCR packet is detected, 1 is detected in "discontinuity_indicator" of the header of a transport packet, or if DIT (Discontinuity Information Table) is detected.

Further, the stream analyzing block 11 imparts a serial packet number (packet identification information) to each serially inputted transport packet and, at the same time, analyzes the header and payload of each transport packet to generate entry point data, discontinuity point data, and mark point data, which are outputted to a stream database creating block 16.

The entry point data are information for identifying the packet in which I picture data that can provide a reproduction start position (an entry point). The discontinuity point data are information for indicating a packet at which STC discontinuity occurred. The mark point data are information for identifying a packet in which image data corresponding to scene change position, commercial start and end positions, and so on are stored.

The PLL block 12 aligns the system clock frequency of 27 MHz by use of a PCR inputted from the stream analyzing block 11 and outputs the aligned system clock frequency to an arrival time clock (ATC) counter 13. The PLL block 12 also generates an STC for counting up in synchronization with the system clock frequency with the PCR as an initial value and outputs a discontinuity occurrence flag to the stream analyzing block 11 if discontinuity occurs in that STC or a discontinuity flag is inputted from the stream analyzing block 11.

Figure 3:
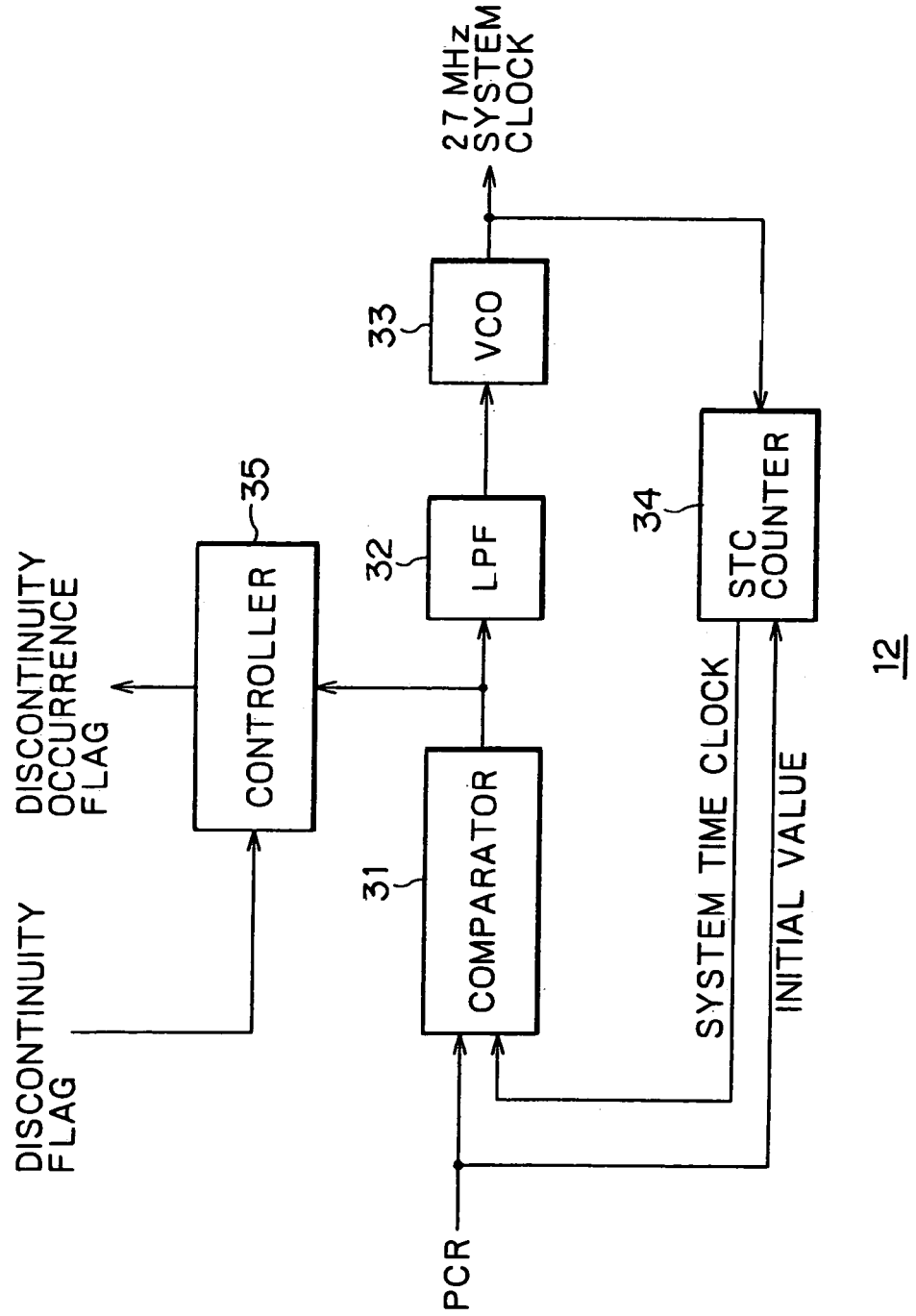
FIG. 3 is a block diagram illustrating a PLL block shown in FIG. 1.

FIG. 3 shows a detailed exemplary configuration of the PLL block 12. PCR inputted from the stream analyzing block 11 at an interval of less than 100 milliseconds is supplied to a comparator 31 and a system time clock counter 34. The comparator 31 generates a signal indicative of a differential value between the PCR value from the stream analyzing block 11 and the STC value from the STC counter 34 and outputs the generated signal to a lowpass filter (LPF) 32 and a controller 35. The lowpass filter 32 removes the high-frequency component of the differential signal from the comparator 31 and outputs the resultant signal to a voltage-controlled oscillator (VCO) 33. The voltage-controlled oscillator 33 generates a system clock frequency of 27 MHz and output it to the STC counter 34 and an ATC counter 13. (FIG. 1) at the following stage so that the differential signal from the lowpass filter 32 becomes 0.

The STC counter 34 counts up the STC with the first inputted PCR being the initial value in synchronization with the system clock frequency (27 MHz) from the voltage-controlled oscillator 33 and outputs the resultant STC to the comparator 31. If the controller 35 determines the value of the differential signal from the comparator 31 is greater than a predetermined threshold, the controller 35 generates a discontinuity occurrence flag and outputs it to the stream analyzing block 11 if a discontinuity flag is inputted from the stream analyzing block 11 for example.

For example, if PCRs having values of certain intervals are sequentially inputted in the PLL block 12, the differential value from the comparator 31 becomes 0 and therefore no discontinuity occurrence flag is outputted from the controller 35. If a PCR having a value greatly different from the value of a previously inputted PCR is inputted, the differential value from the comparator 31 becomes a great value and it is determined in the controller 35 that the differential value is greater than the threshold, upon which a discontinuity occurrence flag is outputted. The PCR which is not continuous is used in the system clock counter 34 as the initial value of a new STC time axis.

Referring to FIG. 1 again, the ATC counter 13 counts up the arrival time clock (hereafter referred to as ATC) in synchronization with the system clock frequency inputted from the PLL block 12 and, at the same time, outputs an arrival time stamp (arrival_time_stamp) which is a sample value of ATC to a transport packet extra header (TP_extra_header) adding block 15. In addition, the ATC counter 13 outputs the ATC to the stream analyzing block 11. It should be noted that the ATC is initialized to 0 when the transport packet located at the beginning of the program is inputted in the recording apparatus 10.

The transport packet extra header adding block 15 adds a transport packet extra header (4 bytes) including the arrival time stamp inputted from the counter 13 when the packet is inputted to the transport packet (118 bytes) from the set top box to generate a source packet (192 bytes) and outputs it to a file system block 17.

The stream database creating block 16 creates an entry point map, system time clock time axis information, program sequence information, and mark point information (each to be described later) by use of the entry point data, discontinuity point data, and mark point data inputted from the stream analyzing block 11 and outputs the created information to the file system block 17 as a stream database. The stream database is information to be used for the random access reproduction of the transport stream recorded on the data recording medium 21.

The file system block 17 removes the intervals between the source packets inputted from the transport packet extra header adding block 15 to generate a DVR transport stream as a file as shown in FIG. 2C. In addition, the file system block 17 creates a file of the stream database (entry point map, system time clock time axis information, program sequence information, and mark point information) inputted from the stream database creating block 16. Further, the file system block 17 outputs the created DVR transport stream and stream database file to an error correction block 18.

The error correction block 18 adds error correction information to the file inputted from the file system block 17 and outputs the resultant file to a modulator 19. The modulator 19 modulates the file from the error correction block 18 in a predetermined manner and outputs the modulated file to a writing block 20. The writing block 20 records the modulated DVR transport stream file to an address on the data recording medium 21 corresponding to the packet number of the transport packet in the file. In addition, the writing block 20 records the modulated stream database file to a predetermined position of the data recording medium 21. The data recording medium 2.1 is such a medium permitting random access as a hard disc or an optical disc for example that can be attached to and detached from the recording apparatus 10.

The controller 22 controls a drive 23 to read a control program from a magnetic disc 24, an optical disc 25, a magneto-optical disc 26, or a semiconductor memory 27, thereby controlling the components of the recording apparatus 10 on the basis of this control program and commands inputted by the user.

The following describes the transport stream recording processing to be executed by the recording apparatus 10 with reference to the flowchart shown in FIG. 4. This transport stream recording processing starts when the user inputs a recording start command.

In step S1, the transport packet extra header adding block 15 adds a transport packet extra header including an arrival time stamp inputted from the ATC counter to a transport packet inputted from a set top box for example to generate a source packet and outputs it to the file system block 17.

The following describes the processing in which the arrival time stamp included in the transport packet extra header is generated with reference to the flowchart shown in FIG. 5.

In step S11, the stream analyzing block 11 detects a PAT packet having PID of 1x0000 storing a PAT (Program Association Table) of the inputted transport stream to read the PAT, obtaining the PID of the packet (hereafter referred to as a PMT packet) storing a PMT (Program Map Table) described in the PAT. In step S12, the PMT packet is detected on the basis of the PID of the PMT packet obtained in step S11 to read the PMT, obtaining the PID of the packet (hereafter referred to as a PCR packet) storing the PCR described in the PMT. In step S13, the PCR is detected on the basis of the PID of the PCR packet obtained in step S12 to read the PCR. This PCR is supplied to the PLL block 12.

In step S14, the PLL block 12 aligns the system clock frequency by use of the PCR inputted from the stream analyzing block 11 and supplies the aligned frequency to the ATC counter 13. In step S15, the ATC counter 13 counts up the ATC in synchronization with the system clock frequency from the PLL 12 and, at the same time, outputs the its sampling value to the transport packet extra header adding block 15 as an arrival time stamp.

Referring to FIG. 4 again, the file system 17 removes the intervals between the source packets inputted from the transport packet extra header adding block 15, creates a file of the resultant DVR transport stream file, and outputs this file to the error correction block 18. In step S3, the error correction block 18 adds error correction information to the DVR transport stream file from the file system block 17. The modulator 19 modulates the error-corrected file. The writing block 20 records the modulated file to an address on the data recording medium 21 corresponding to the packet number.

Figure 6:
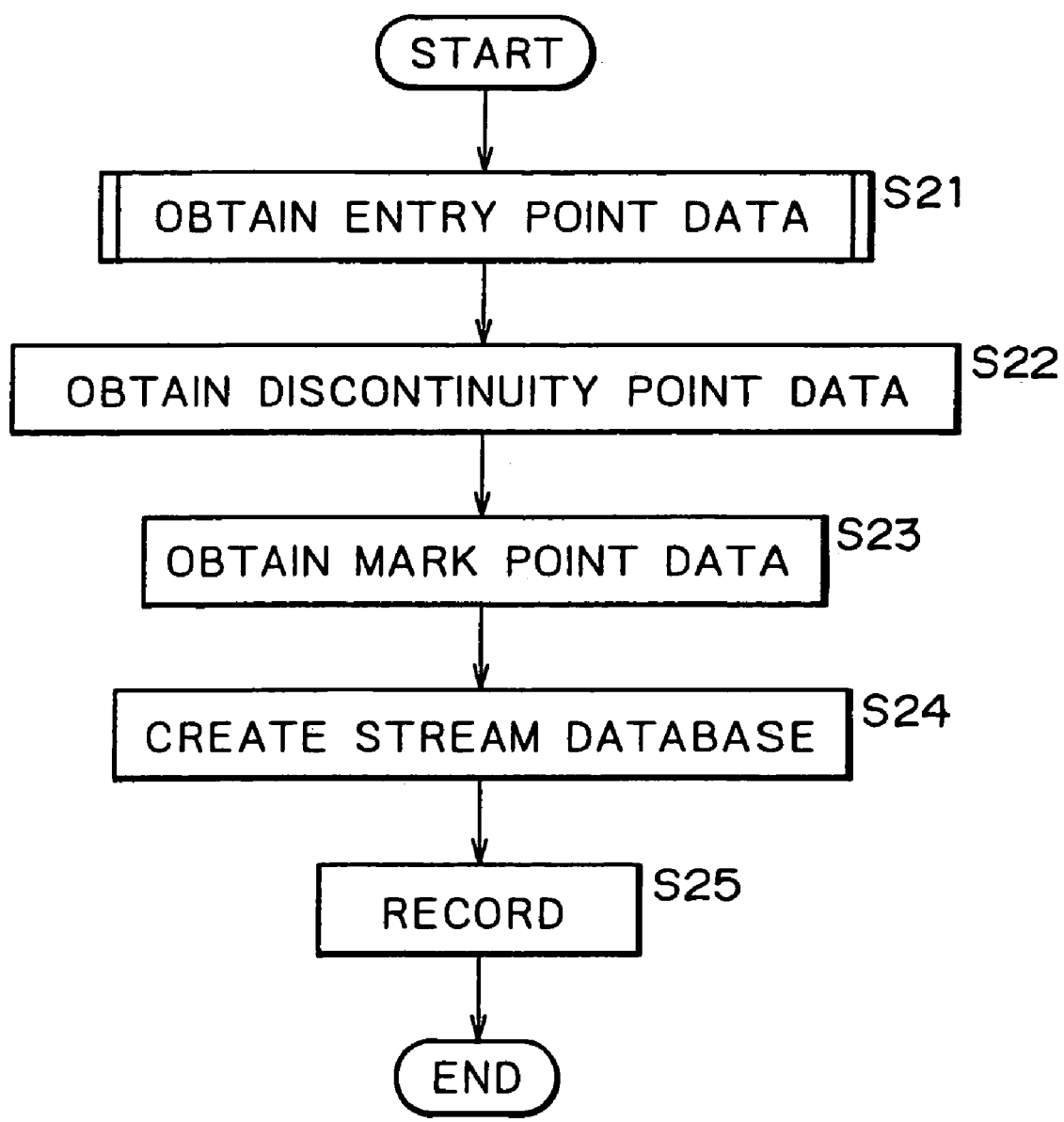
FIG. 6 is a flowchart describing stream database recording processing by the recording apparatus.

The following describes the stream database recording processing to be executed along with the above-mentioned transport stream recording processing, with reference to the flowchart shown in FIG. 6.

In step S21, the stream analyzing block 11 analyzes sequentially inputted transport streams to detect a packet in which I picture data of the MPEG2 systems standard are stored, obtaining, as entry point data, the packet number of this packet and the PTS (Presentation Time Stamp) of this I picture. It should be noted that PTS is information included in the header of a PES packet of the MPEG2 systems standard and indicates a time along the system time clock time axis on which this picture is reproduced.

Figure 7:
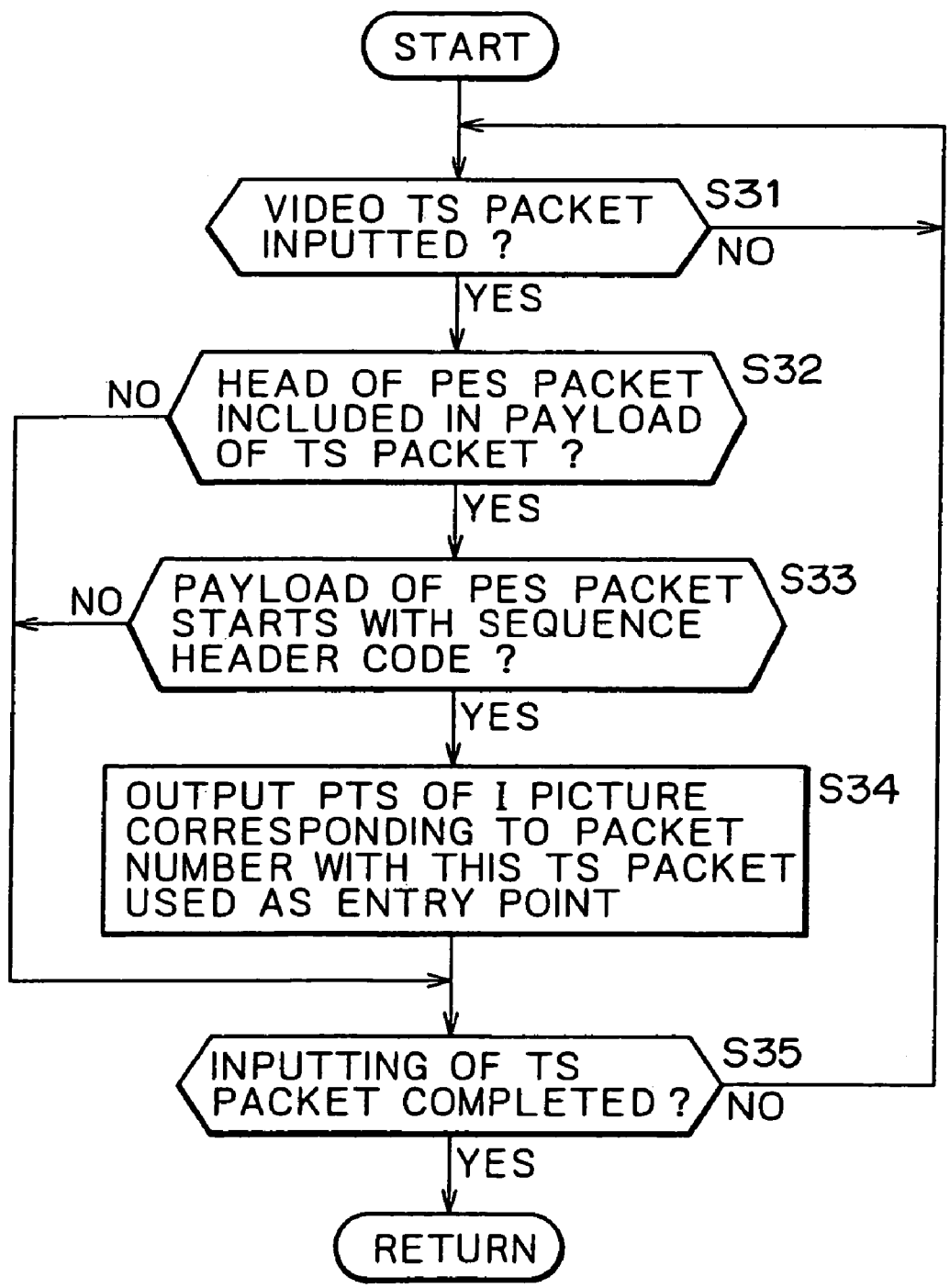
FIG. 7 is a flowchart describing processing in step S21 shown in FIG. 6.

The following describes specific processing of step S21 with reference to the flowchart shown in FIG. 7. In step S31, the stream analyzing block 11 determines whether a transport packet has been inputted or not and waits until the transport packet is inputted. If the transport packet is found inputted, the stream analyzing block 11 goes to step S32.

In step S32, the stream analyzing block 11 detects if 1 is written to a payload unit start indicator (payload_unit_start_indicator) included in the transport packet header of the transport packet, thereby determining whether the payload of the transport packet starts from first byte of the PES packet. If 1 is detected in the payload unit start indicator and the payload of the transport packet is found starting from the first byte of the PES packet, then the stream analyzing block 11 goes to step S33.

In step S33, the stream analyzing block 11 determines whether 1x000001B3, the sequence header code (sequence_header_code) of MPEG video, is written to the beginning of the PES packet described in the payload of the transport packet. If the sequence header code of MPEG video is found written, the stream analyzing block 11 determines that the I picture data are stored in the payload of this transport packet and goes to step S34.

In step S34, the stream analyzing block 11 determines that this transport packet is an entry point, relates the packet number (by use of this packet number, the address on the data recording medium 21 at which this packet is recorded can be identified) of this transport packet to the PTS of the I picture stored in this transport packet, and outputs the resultant PTS and the identification information (video PID) of this program to the stream database creating block 16 as the entry point data.

Figure 8:
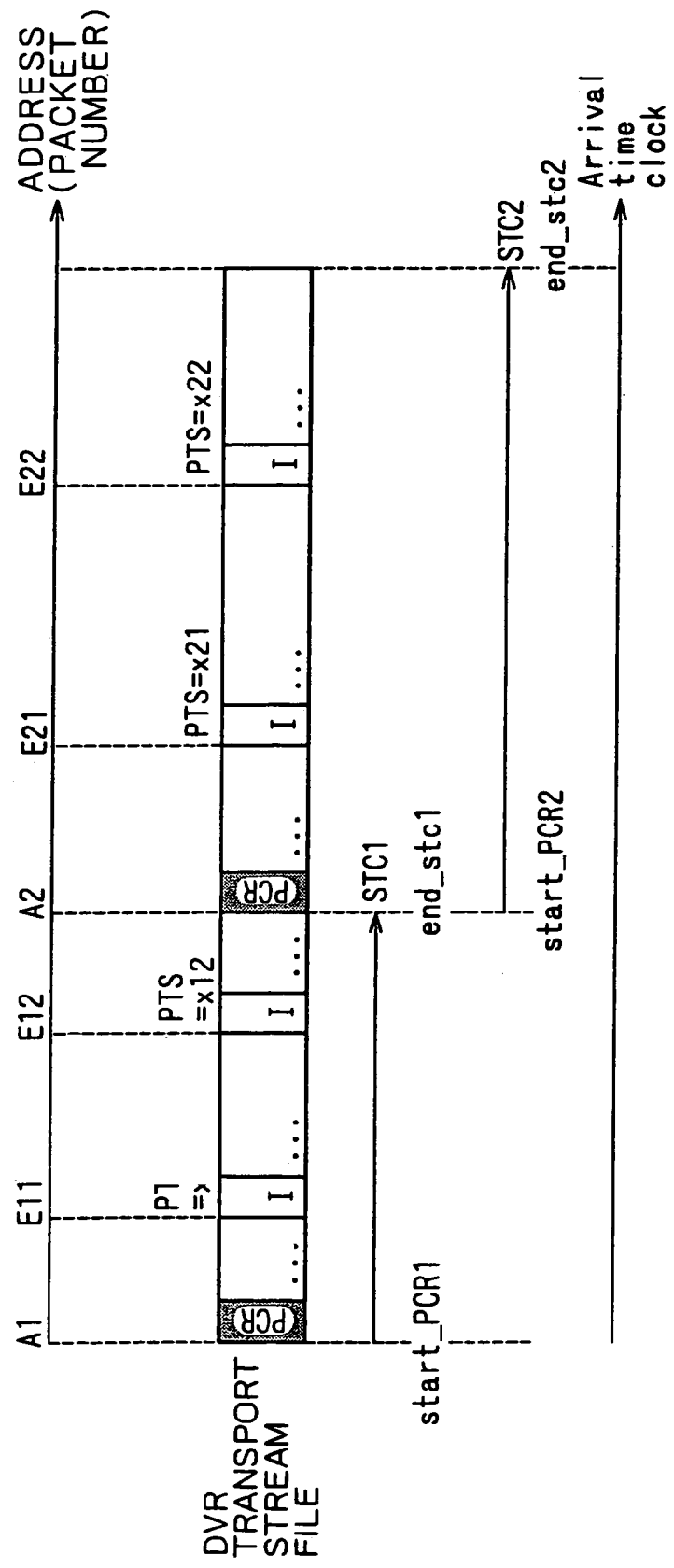
FIG. 8 is a diagram illustrating a relationship between STC discontinuity point and entry point.

For example, as shown in FIG. 8, if the I picture data are found stored in the packets of packet numbers E11, E12, E21, and E22, PTS=x11, x12, x21, and x22 are related to the packet numbers E11, E12, E21, and E22 respectively to be outputted to the stream database creating block 16.

In step S35, the stream analyzing block 11 determines whether the inputting of transport packets has come to an end or not. If the inputting of transport packets is found not ended, then the stream analyzing block 11 returns to step S31 to repeat the above-mentioned processing. If the inputting of transport packets is found ended, the stream analyzing block 11 returns to step S22 shown in FIG. 6.

In step S22, the stream analyzing block 11 outputs the discontinuity information about transport stream STC time axis and the discontinuity information about program sequence to the stream database creating block 16 as discontinuity point data. As for the discontinuity information about STC time axis, the stream analyzing block 11 outputs the information (STC time axis ID, PCR_PID, start_PCR_value, end_STC_value, and RSPN_STC start) about the STC time axis changing before and after the inputting of a discontinuity point occurrence flag from the PLL block 12 to the stream database creating block 16 as the discontinuity point data. As for the discontinuity information about PSI/SI, the stream analyzing block 11 outputs the changing address of PSI/SI and the contents of new PSI/SI to the stream database creating block 16 as the discontinuity point data.

The following describes the discontinuity point data. STC time axis ID is information for identifying an STC time axis. A pair of start_PCR_value and end_STC_value indicate the start time and the end time of a continuous STC time axis respectively.

For the start_PCR value, the value of the PCR that caused STC discontinuity is used. However, for the first start_PCR_value of the inputted transport stream, the value of the PCR stored in the first PCR packet is used.

The end_STC_value is obtained from the following equation:

$$end\_STC\_value = last\_PCR + PCR\_gap$$

where, last_PCR is the value of the PCR packet immediately before the PCR packet that changed the STC time axis. PCR_gap is a time difference between the last_PCR and the occurrence of STC discontinuity. However, for the last end_STC_value of the inputted transport stream, the input time of the last transport packet is used.

For RSPN_STC_start, the packet number of a packet at which STC starts is used. To be more specific, the packet number of the PCR packet in which PCR providing start_PCR_value is used. Here, RSPN stands for Relative Packet Number, indicating a relative packet number which is counted with a packet number given to the head packet of the transport stream being an initial value. Alternatively, a packet number given at detection of STC discontinuity, a packet number given at detection of a change in the packet ID of a PCR packet, a packet number given at detection of 1 in discontinuity_indicator of the header of a transport packet, or a packet number given at detection of a DIT packet may be used for RSPN_STC_start.

Figure 9:
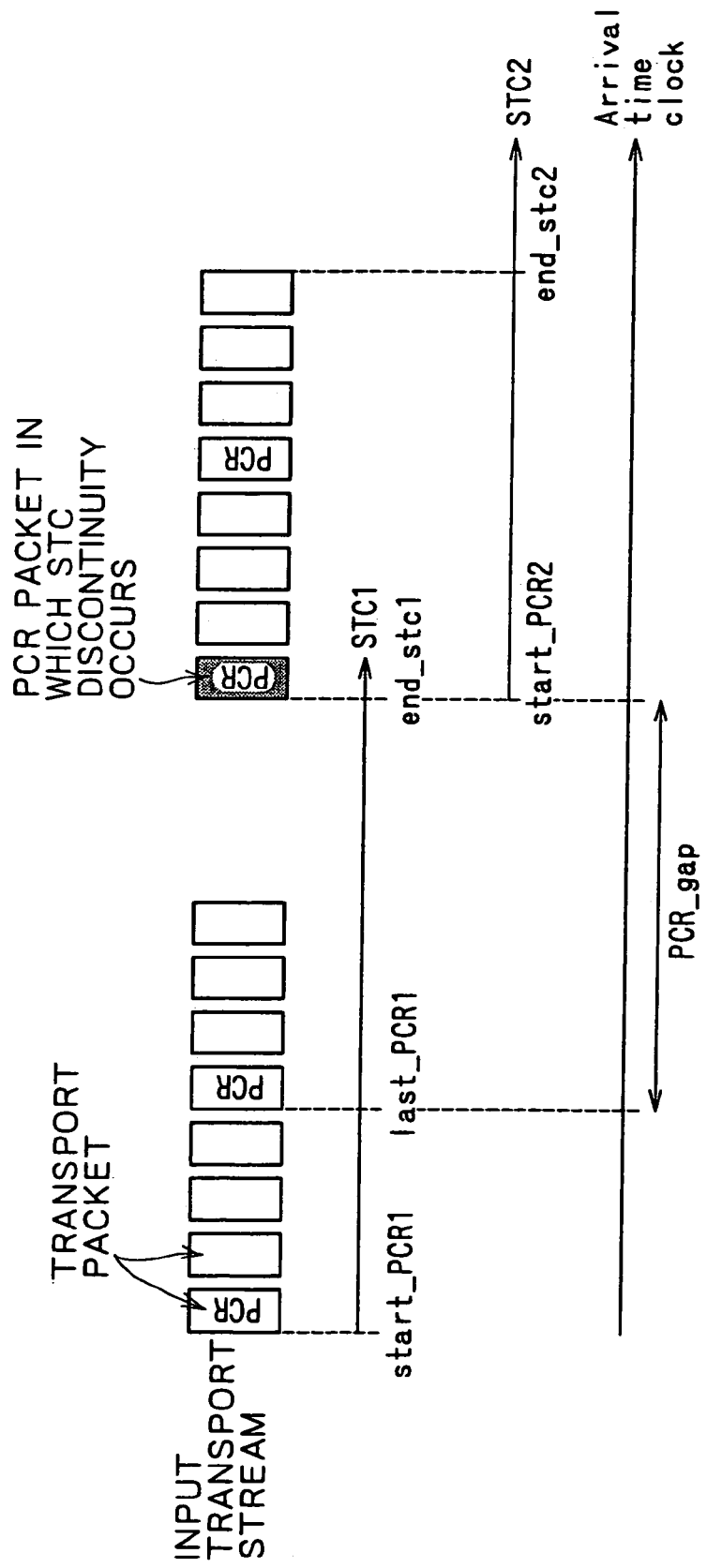
FIG. 9 is a diagram illustrating STC discontinuity.

To be more specific, as shown in FIG. 9, if STC discontinuity occurred once in a sequence of transport streams and the STC_time axis from the beginning of the transport stream to the discontinuity occurrence point is STC1 and the STC time axis thereafter is STC2, then, for the start_PCR value of the STC time axis STC1, start PCR1 is used and, for the end_STC_value, the end_stc1 obtained by adding PCR_gap to the last_PCR is used. For the start_PCR value of the STC time axis STC2, the start PCR2 is used and, for the end_STC_value, the end_stc2 is used.

Figure 10:
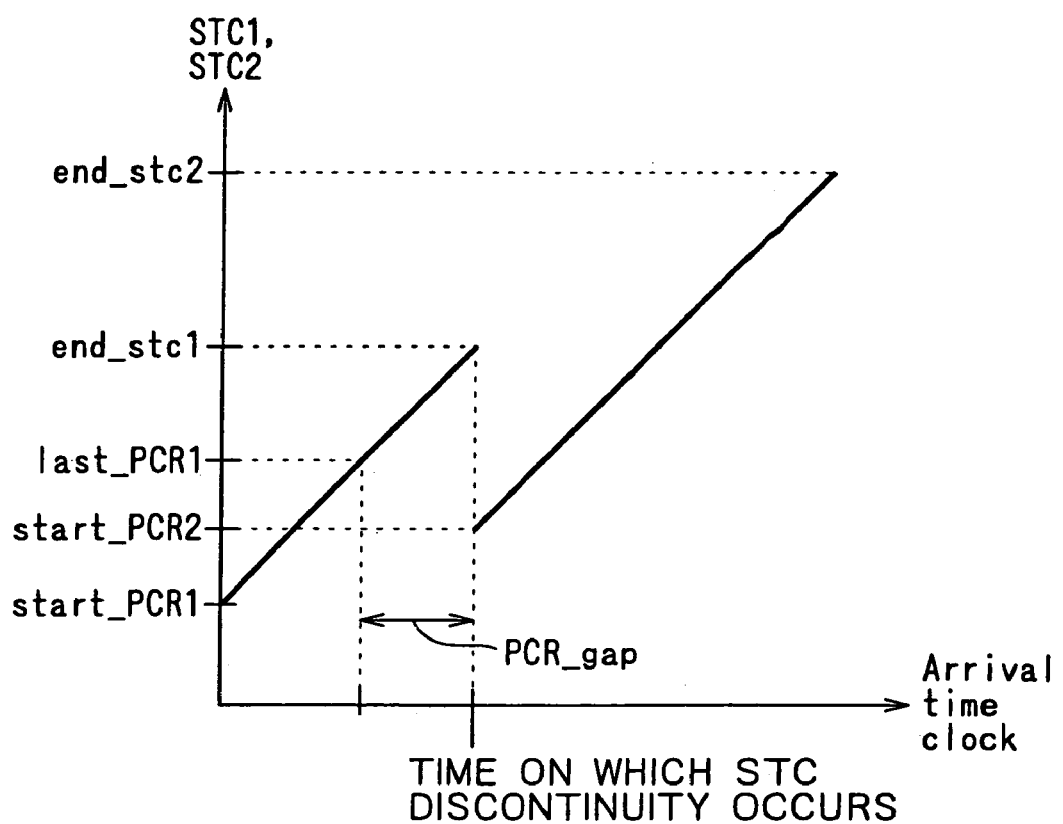
FIG. 10 is a diagram illustrating STC discontinuity.

As seen from FIGS. 9 and 10, regardless of the STC discontinuity, the ATC to be generated by the ATC counter 13 is continuous regardless of the STC discontinuity. However, referring to FIG. 10, the lateral axis indicates ATC and the vertical axis indicates the STC, indicating a relationship between start_PCR_value and end_STC_value.

Figure 11:
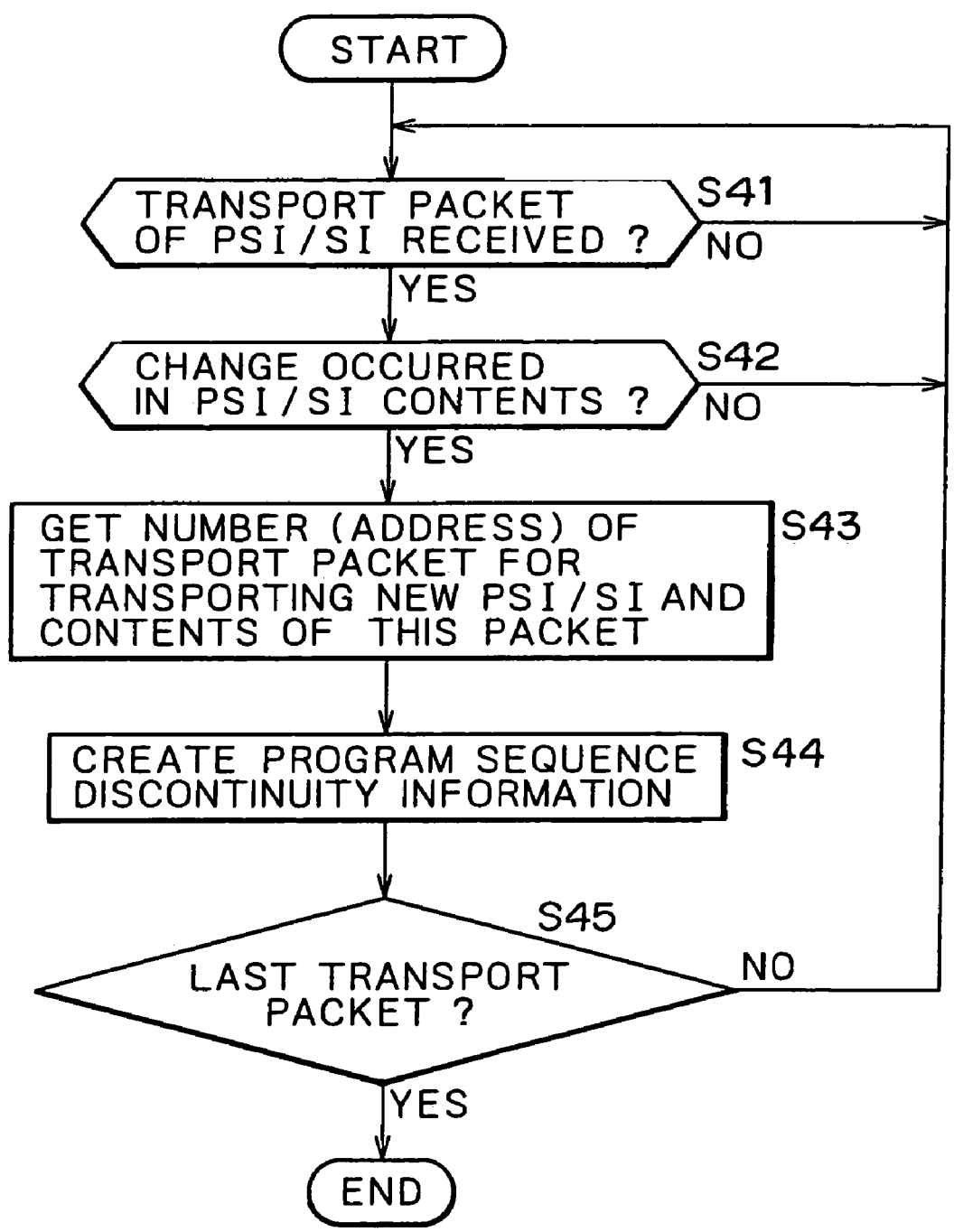
FIG. 11 is a flowchart describing the processing for analyzing discontinuity in a program sequence.

The following describes the processing for analyzing the discontinuity information about the program sequence with reference to the flowchart shown in FIG. 11.

In step S41, the stream analyzing block 11 waits until the transport packets of PSI/SI are inputted. When the transport packets of PSI/SI have been inputted, the stream analyzing block 11 goes to step S42.

To be specific, the transport packets of PSI/SI are packets of PAT, PMT, and SIT. SIT is a transport packet describing service information of a partial transport stream specified by the DVB standard.

In step S42, the stream analyzing block 11 determines whether a change occurred in the contents of PSI/SI. Namely, the stream analyzing block 11 determines whether the contents of each of PAT, PMT, and SIT differed from those inputted previously. If a change is found, the stream analyzing block goes to step S43. It should be noted that, in the first step S42 after the recording started, the stream analyzing block also goes to step S43 because there is no PSI/SI transport packet inputted before.

In step S43, the stream analyzing block acquires the packet number given to the transport packet for transporting new PSI/SI and the contents thereof and outputs the packet number and the contents to the stream database creating block 16. In step S44, the stream database creating block 16 creates the discontinuity information of the program sequence.

In step S45, the stream analyzing block 11 determines whether the inputting of the transport packets has been completed. If the inputting is found not completed, the stream analyzing block returns to step S41 to repeat the processing mentioned above. If the inputting is found completed in step S45, this processing comes to an end.

If no change is found in the contents of PSI/SI in step S42, then the stream analyzing block returns to step S41 to repeat the processing mentioned above.

Referring to FIG. 6 again, the stream analyzing block 11 analyzes the header and payload of each sequentially inputted transport packet in step S23 to detect a mark point (for example, scene change position, commercial start and end positions, and so on) and outputs the information for identifying the packets storing their image data (identification information (video PID) of this program, system time clock time axis ID, and PTS of this picture) to the stream database creating block 16 as the mark point data.

It should be noted that the processing operations from step S21 to step S23 were described in the order of time for the convenience of description. Actually, however, these processing operations are executed in parallel for each of the inputted transport packets.

In step S24, the stream database creating block 16 creates an entry point map as shown in FIG. 12 that describes the entry point data from the stream analyzing block 11 for each program. It should be noted that the offset source packet number is a packet number assigned to the first packet of the transport stream.

The stream database creating block 16 also creates system time clock time axis information composed of system time clock time axis ID (STC_sequence_id), PCR_PID, start_PCR_value, end_STC_value, and RSPN_STC_start as shown in FIG. 13. RSPN_STC_start is a packet number which is counted with the above-mentioned offset source packet number being the initial value.

Moreover, the stream database creating block 16 creates mark point information describing the mark point data (video PID, system time clock time axis ID, and PTS of image) supplied from the stream analyzing block 11.

In addition, the stream database creating block 16 creates program sequence information which describes the discontinuity point data (details to be described) of the program sequence supplied from the stream analyzing block 11.

In step S25, the stream analyzing block 16 outputs the entry point map, the system time clock time axis information, and the mark point information created in step S24 to the file system block 17 as the stream database. The file system block 17 creates a file of the inputted stream database. The stream database file is added with error correction information by the error correction block 18, the error-corrected stream database is modulated by the modulator 19, and the modulated stream database is recorded by the writing block 20 onto the data recording medium 21 at a predetermined position.

As described, the stream database recorded on the data recording medium 21 is used for the reproduction processing to be described later, especially for random access reproduction.

It should be noted that the entry point map of the stream database describes the packet number as the information for identifying the position of the entry point, thereby reducing the number of required bits as compared with the representation of the entry point position by an address of byte-precision.

Referring to FIG. 14, there is shown a first example of the an STC discontinuity information syntax.

STC_Info( ) denotes that this syntax provides STC discontinuity point information. STC_Info( ) has STC time axis information in the number indicated by num_of_STC_sequences. STC_sequence_id denotes STC time axis ID (refer to FIG. 13). Fields PCR_PID, RSPN_STC_start, start_PCR_value, and end_stc_value have the same meanings as those of the corresponding variable names shown in FIG. 13.

Referring to FIG. 15, there is shown a second example of an STC discontinuity information syntax. STC_Info( ) has STC time axis information in the number indicated by num_of_STC_sequences. STC_sequence_id denotes STC time axis ID (refer to FIG. 13). Offset_STC_sequence id is STC time axis ID given to head STC time axis of the transport stream. The fields of RSPN_STC start have the same meanings as those of the corresponding variable names shown in FIG. 13.

This syntax uses start_PTS and end_PTS instead of start_PCR_value and end_STC_value used in the syntax shown in FIG. 14. start_PTS denotes the PTS of the first presentation unit on the STC time axis ID indicated by STC_sequence_id. end_PTS denotes the PTS of the last presentation unit on the STC time axis ID indicated by STC_sequence_id.

It should be noted that PCR_PID is omitted from the syntax shown in FIG. 15 by limiting the format to only one PCR_PID that is referenced by the transport stream to be recorded.

Referring to FIG. 16, there is shown a first example of a discontinuity information syntax of the program sequence.

ProgramInfo( ) indicates that this syntax is program sequence discontinuity information. ProgramInfo( ) has PSI/SI information in the number indicated by number_of_PSI_SI change. PSI_SI_type indicates the type of following PSI/SI. It should be noted that PSI_SI_type=0 denotes PAT, PSI_SI_type=1 denotes PMT, and PSI_SI_type=2 denotes SIT. PSI_SI_type=3 to 255 denotes reserve.

If PSI_SI type indicates PAT, a field of start_PAT address follows. The start_PAT_address denotes an address on the DVR transport stream file of the transport packet in which new PAT is stored and is represented in packet number.

If PSI_SI_type indicates PMT, fields of video_PID equal to the number indicated in each of program_map PID, start_PMT_address, program_number, PCR_PID, number_of_videos, number_of_audios, and number_of_videos and fields of audio_PID and AudioCodingInfo( ) equal to the number indicated by VideoCodingInfo( ) and number_of_audios follow program_map_PID is the packet ID of new PMT. The start_PMT_address is an address on the DVR transport stream file of the transport packet in which new PMT is stored and is represented in packet number. The program_number is a program number written in the contents of new PMT. The PCR_PID is the packet ID of the transport packet for transporting the PCR written in the content of new PMT. The number_of_videos is the number of video streams written in the content of new PMT. The video_PID is the packet ID of the transport packet for transporting video streams.

VideoCodingInfo( ) denotes coding information of that video stream; for example, it includes information indicating whether video is SDTV or HDTV and information indicating video frame frequency and pixel aspect ratio number_of_audios denotes the number of audio streams written in the contents of new PMT. audio_PID is the packet ID of a transport packet for transmitting the au stream.

AudioCodingInfo( ) is coding information of that audio stream; for example, it includes information about audio coding method (MPEG1 audio, MPEG2AAC audio, or Dolby AC3 for example), component type (2-channel stereo or 5.1 ch-multichannel stereo for example), and sampling frequency.

If PSI_SI_type indicates SIT, a field of start_SIT_address follows. The start_SIT_address is an address on the DVR transport stream file of the transport packet in which new SIT is stored and is represented in packet number.

Referring to FIG. 17, there is shown a second example of ProgramInfo( ) syntax. This syntax can be used to limit the format only to one PCR_PID which is referenced by the transport stream to be recorded. In this format, a time interval having the following characteristics (1) through (3) in the transport stream is called program_sequence.

(1) PCR_PID value remains unchanged.

(2) The number of video elementary streams remains unchanged. And the PID value for each video stream and the coding information defined by VideoCodingInfo remains unchanged.

(3) The number of audio elementary streams remains unchanged. And the PID value for each audio stream and the coding information defined by AudioCodingInfo remains unchanged.

program_sequence has only one system time base at one time. In addition, program_sequence has only one PMT at one time. ProgramInfo( ) stores the address of a location at which program_sequence starts. RSPN_program_sequence_start indicates this address. Its value may only indicate the source packet number of the boundary at which the above-defined program_sequence changes. For example, the above-mentioned start_PMT_address (the address of the transport packet in which new PMT is stored) may be set.

Figure 18:
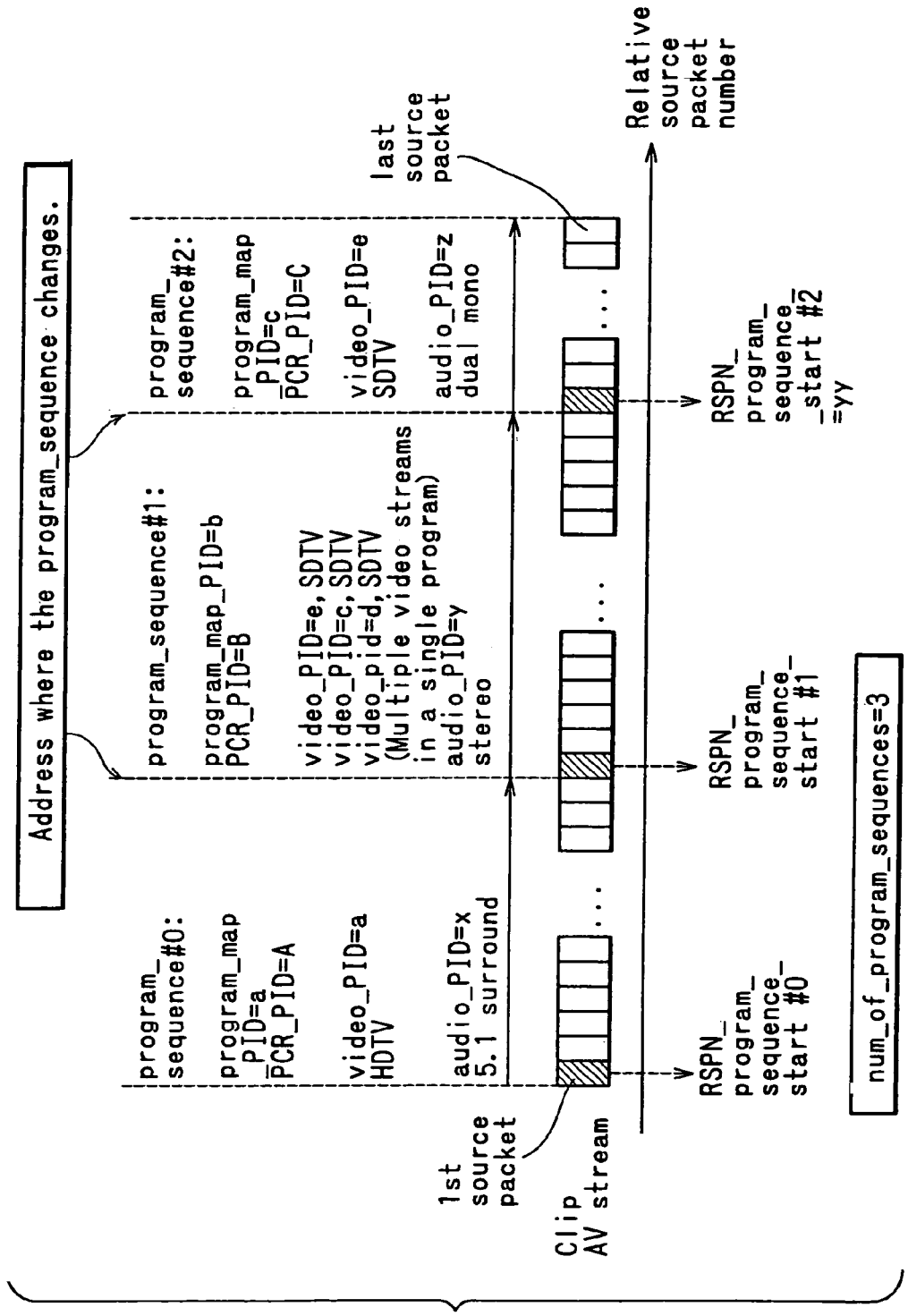
FIG. 18 is a diagram illustrating program sequence.

FIG. 18 shows an example of program_sequence. In this example, the contents of program_sequence change twice halfway in the transport stream, so that there are three program_sequences. The start source packet number (address) and the source packet numbers (addresses) at the change points of program_sequence are stored in RSPN_program_sequence_start.

Referring to FIG. 19, there is shown an example of entry point map syntax.

EntryPointMap( ) indicates that this syntax is for an entry point map. EntryPointMap( ) has the entry point information for each of video_PIDs in the number indicated by the number_of_video streams. The video_PID is the packet ID of the transport packet for transporting video streams. The number_of_entry points indicates the number of entry points of this video stream. The PTS EP start and RSPN_EP start have the same meanings as the PTS of the entry point and the address of the entry point respectively shown in FIG. 12.

Referring to FIG. 20, there is shown a mark syntax. Clip-Mark denotes that the syntax concerned is the syntax of mark. version_number represents four characters indicative of the version number of the ClipMark( ). length is 32-bit unsigned integer indicative of the number of bytes of ClipMark( ) from immediately behind the length field to the last of ClipMark( ). number_of_clip_marks is a 16-bit unsigned integer indicative of the number of marks stored in ClipMark. number_of_Clip_marks may be zero. mark_type is an 8-bit field indicative of mark_type, indicating a type such as CM start and end. mark_time_stamp having a 32-bit field stores a time stamp indicative of the point at which mark is specified. mark_time_stamp must indicate the high-order-32 bits of the 33-bit PTS corresponding to the presentation unit referenced by mark. STC_sequence having an 8-bit field indicates STC_sequence_id of the STC continuous interval in which mark is placed.

FIG. 21 shows an example in which marks such as the access point of the in-point or out-point for a recorded transport stream file (DVR transport stream file) and the start or end point of CM are represented in values of STC_sequence_id and PTS. The in-point and out-point are the start point and end point of reproduction respectively.

Because the transport stream to be recorded may include an STC discontinuity point, PTSs having the same value may appear in that transport stream. Therefore, if the access point for the transport stream to be recorded is set on a PTS basis, the PTS value alone is not enough for identifying the access point. For the identification, the STC time axis ID in which the PTS is included is used together.

The following describes the relationship between EntryPointMap and STC_Info. EntryPointMap about the video stream to be referenced by one video_PID, which is the database attached to the file of the transport stream to be recorded is created in one table regardless of STC discontinuity point. Comparison between the value of RSPN_EP_start and the value of RSPN_STC_start defined in STC_Info( ) indicates the boundary of the data of EP_map belonging to each STC_sequence.

Figure 22:
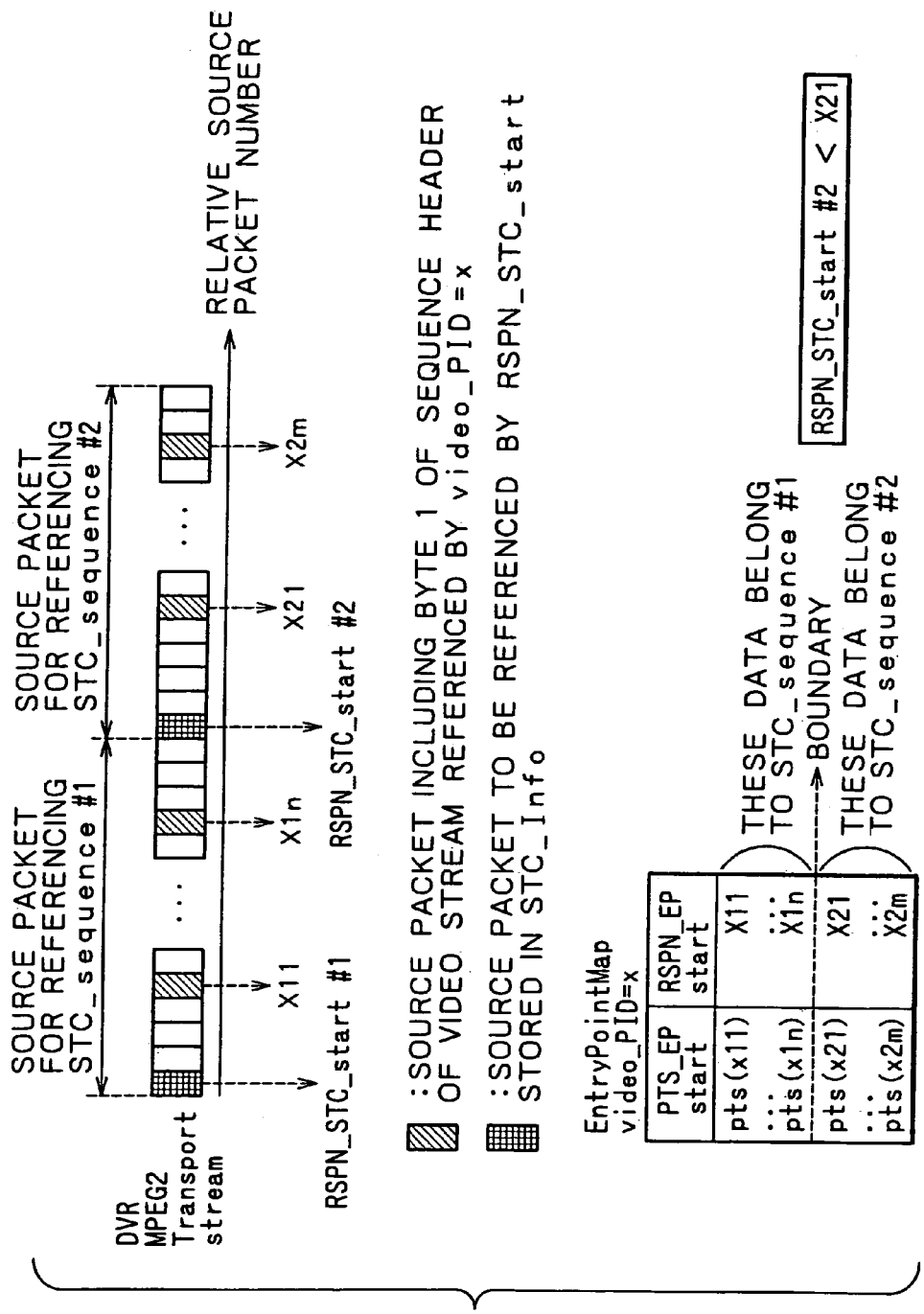
FIG. 22 is a diagram describing a relationship between EntryPointMap and STC_Info.

In an example shown in FIG. 22, address X21 of EntryPoint included in EntryPointMap is greater than RSPN_STC start#2, which is the start address of the STC time axis indicated by STC_Info( ). Entry point data before address X1n of EntryPoint belong to the STC time axis of STC_sequence#1. The entry point data after address X21 belong to the STC time axis of STC_sequence#2.

Figure 23:
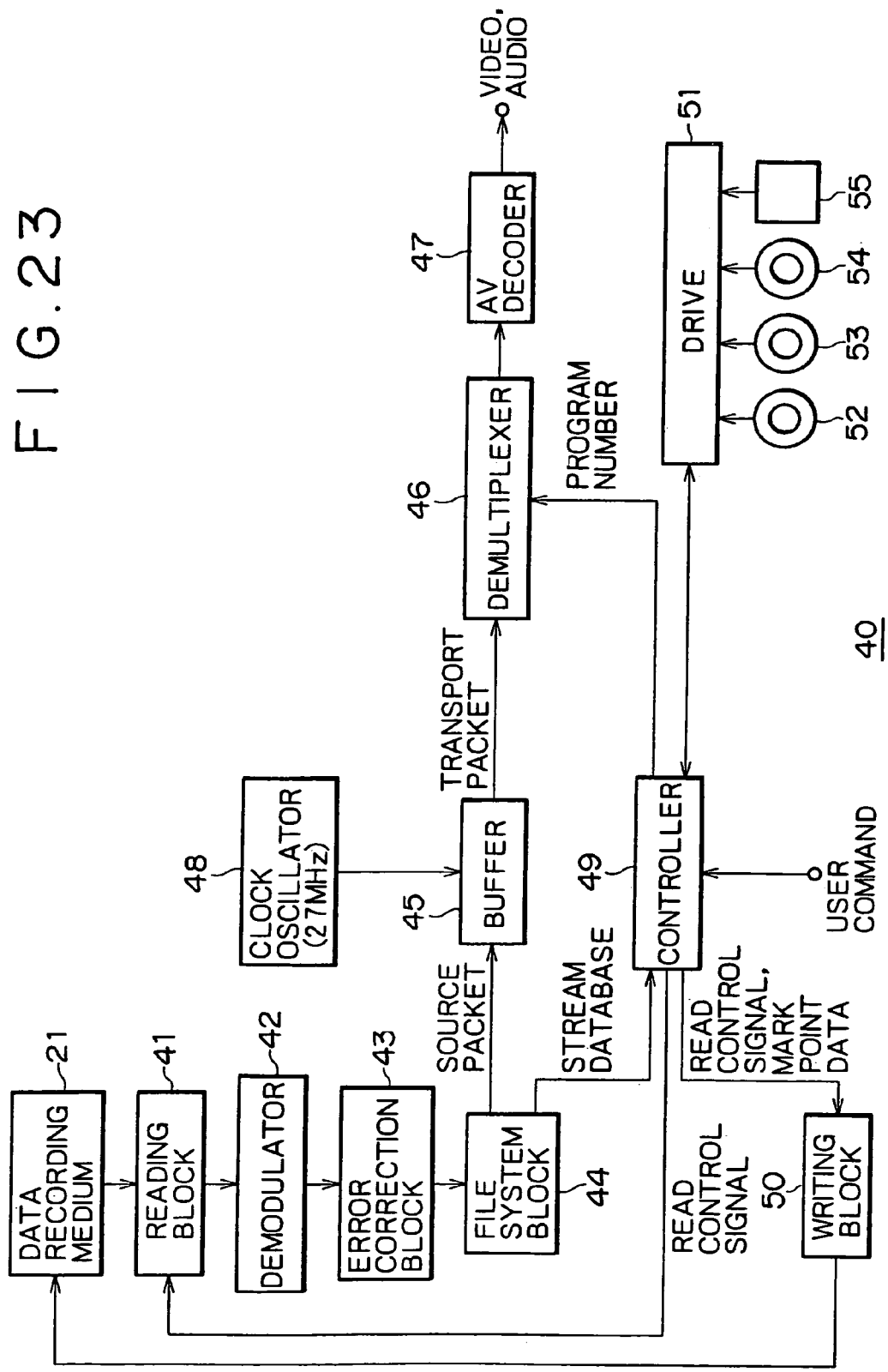
FIG. 23 is a block diagram illustrating an exemplary configuration of a reproducing apparatus practiced as one embodiment of the invention.

FIG. 23 shows an exemplary configuration of a reproducing apparatus 40 for reproducing DVR transport streams from the data recording medium 21 on which DVR transport streams and stream database files are recorded by the recording apparatus 10.

The reproducing apparatus 40 also has a capability of adding user-specified mark points (the position of a scene that the user liked during viewing, the position at which viewing discontinued, and so on) to the mark point information included in the stream database recorded on the data recording medium 21 and recording the added mark points thereto.

A reading block 41, upon receiving a read control signal inputted from a controller 49, reads data corresponding to a DVR transport stream file or a stream database file from the data recording medium 21 and outputs the read data to a demodulator 42. The demodulator 42 performs demodulation, as corresponding to the modulator 19 shown in FIG. 1, on the data inputted from the reading block 41 and outputs the demodulated data to an error correction block 43. The error correction block 43 executes error correction on the data on the basis of the error correction information given by the error correction block 18 shown in FIG. 1 and outputs the resultant DVR transport stream file or stream database file to a file system block 44.

The file system block 44 separates the DVR transport stream file inputted from the error correction block 43 into source packets and outputs them to a buffer 45. The file system block 44 also supplies the stream database inputted from the error correction block 43 to the controller 49.

The buffer 45 outputs, to a demultiplexer 46, the transport packet obtained by removing the transport packet extra header from that source packet when the arrival time stamp included in the transport packet extra header of the source packet becomes equal to the ATC supplied from a clock oscillator 48.

The demultiplexer 46 extracts the video packet and the audio packet corresponding to a user-specified program from the transport packet inputted from the buffer 45 and outputs the extracted packets to an AV decoder 47. The AV decoder 47 decodes the video packet and the audio packet supplied from the demultiplexer 46 and outputs the resultant video signal and audio signal to a subsequent stage. The clock oscillator 48 generates the ATC of 27 MHz and outputs it to the buffer 45.

The controller 49 controls a drive 51 to read a control program from a magnetic disc 52, an optical disc 53, a magneto-optical disc 54, or a semiconductor memory 55, thereby controlling each component of the reproducing apparatus 40 on the basis of the control program and the commands inputted by the user.

When a command for specifying a new mark point is inputted by the user, the controller 49 converts the position of the new mark point into mark point data (video PID, system time clock time axis ID, and PTS of image) and outputs the mark point data to the writing block 50.

The writing block 50 adds the mark point data inputted from the controller 49 to the mark point information included in the stream database recorded on the data recording medium 21 and records the mark point data thereon.

Figure 24:
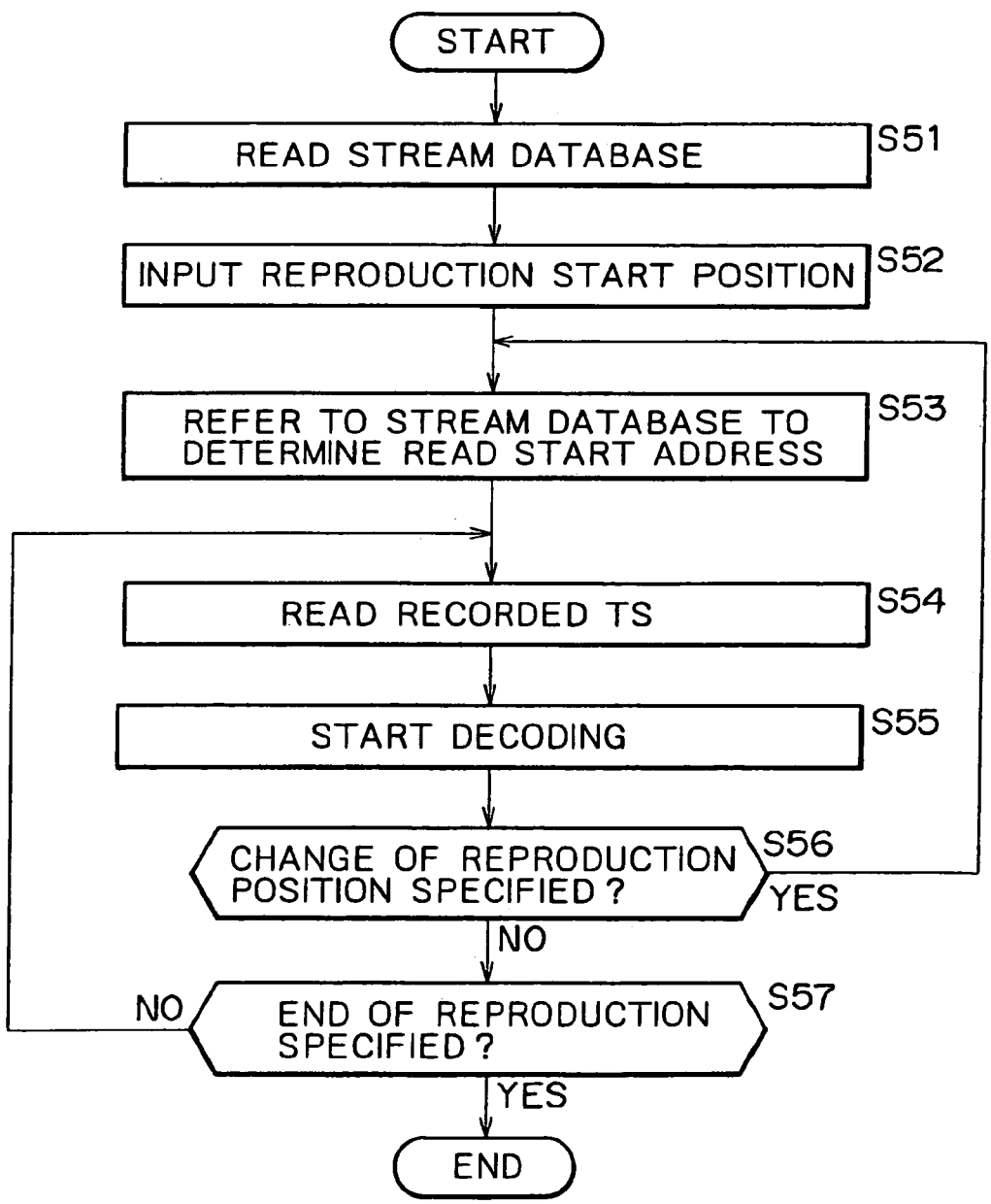
FIG. 24 is a flowchart describing reproduction processing by the reproducing apparatus.

The following describes the reproduction processing by the reproducing apparatus 40 with reference to the flowchart shown in FIG. 24. This reproduction processing starts when the commands for specifying a reproduction program and starting the reproduction processing are inputted by the user.

In step S51, the stream database for the reproduction program is read by the reading block 41 from the data recording medium 21, the stream database is processed by the demodulator 42 through the file system block 44, and the resultant stream database is supplied to the controller 49. In step S52, reproduction start position data (video PID, STC time axis ID, and PTS of image) are inputted by the user into the controller 49. It should be noted that, for the position from which reproduction starts, the mark point in the mark point information included in the stream database may be specified.

In step S53, the controller 49 compares the reproduction start position inputted in step S52 with the stream database obtained in step S51 to detect the entry point nearest to the reproduction start position. By use of the packet number written in the detected entry point, the controller computes the read start address of the DVR transport stream.

In step S54, the reading block 41, under the control by the controller 49, starts reading the DVR transport stream from the read start address on the data recording medium 21 determined in step S53. The DVR transport stream is processed by the demodulator 42 through the demultiplexer 46 and the resultant video packet and audio packet are inputted in the AV decoder 47.

In step S55, the AV decoder 47 decodes the video packet and audio packet supplied from the demultiplexer 46 and outputs the resultant video signal and audio signal to a monitor (not shown) for example.

In step S56, the controller 49 determines whether a change in the reproduction position for random access reproduction for example has been specified by the user. If the change is found specified, the controller returns to step S53 to determine the read start address, repeating the processing mentioned above.

If no change is found specified in step S56, the controller goes to step S57. In step S57, the controller 49 determines whether the end of reproduction has been specified by the user. If the end of reproduction is found not specified, the controller returns to step S54 to repeat the processing mentioned above. Then, if the end of reproduction is found specified, this reproduction processing comes to an end.

Figure 25:
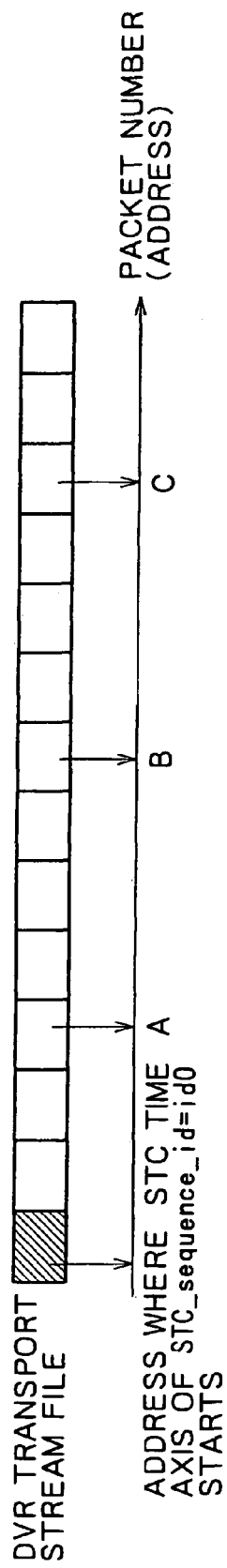
FIGS. 25A, 25B, and 25C are diagrams describing a method of reproduction by use of mark point information.

Next, the reproduction by use of mark point information will be described. Assume, for example, as shown in FIGS. 25A through 25C, that a. DVR transport stream file and its database, EntryPointMap, ClipMark, and STC_Info, are recorded.

Figure 26:
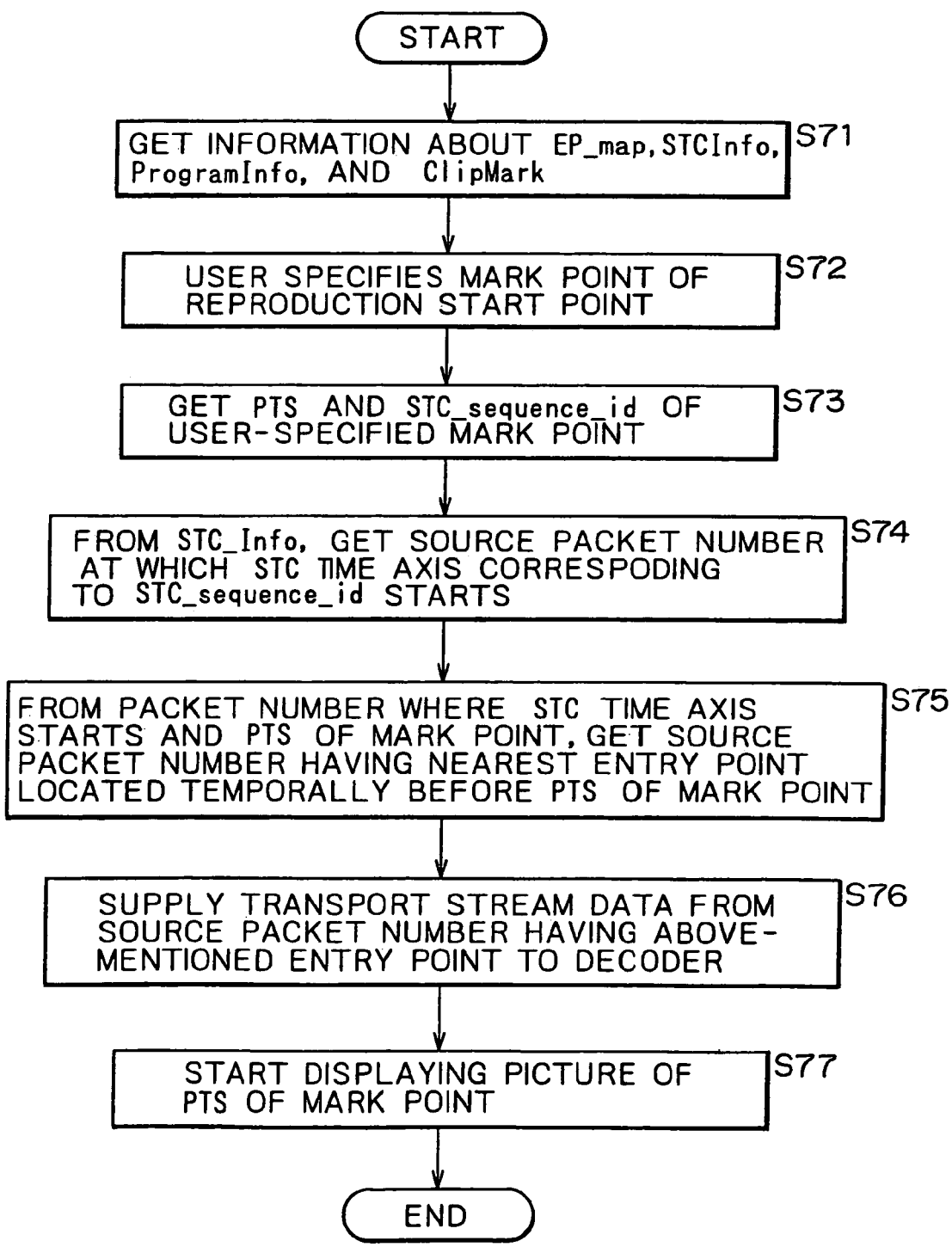
FIG. 26 is a flowchart describing cued reproduction processing of a scene indicated by mark point information.

First, cued reproduction processing of a scene indicated by mark point will be described with reference to the flowchart shown in FIG. 26.

In step S71, EntryPointMap, STC_Info, Program_Info, and ClipMark, which are the database of the DVR transport stream file, are read. In step S72, the specification of the mark point for a reproduction start point by the user is accepted. For example, a thumbnail image indicative of the start point of the scene is displayed on a menu screen, in which the mark point related to the thumbnail image selected by the user is accepted.

In step S73, the PTS and STC_sequence_id of the mark point specified by the user are obtained. In step. S74, the source packet number at which the STC time axis corresponding to STC_sequence_id is obtained from STC_Info. In step S75, the source packet number which is temporally before the PTS of the mark point and has the nearest entry point is obtained from the packet number at which STC time axis starts and the PTS of the mark point.

In step S76, transport stream data are read from the source packet number obtained in step S75 and supplied to the AV decoder 47. In step S77, the AV decoder 47 starts displaying the transport stream data beginning with the picture of the PTS of the mark point.

The following specifically describes the processing for displaying a picture matching PTS (a0) of CM start point (CMstart) shown in FIGS. 25A through 25C for example. It is assumed that the CM start point be on the STC time axis with STC_sequence_id being id0 and the source packet number at which the STC time axis starts be smaller than A. If PTS (A)>PTS (a0) for example, packet number A is obtained in step S75. Then, in step S76 the transport stream starting with packet number A is supplied to the AV decoder 47 to be decoded, upon which display starts with the picture corresponding to PTS (a0) in step S77.

Next, CM skip reproduction processing by use of mark point information will be described with reference to the flowchart shown in FIG. 27.

In step S81, EntryPointMap, STC_Info, Program_Info, and ClipMark, which are the database of the DVR transport stream file, are read. In step S82, the specification of CM skip reproduction by the user is accepted. In step S83, the PTS and STC_sequence_id of each piece of mark information with mark type being CM start point or CM end point (CMend) are obtained.

In step S84, the source packet number at which the STC time axis corresponding to STC_sequence_id of CM start point is obtained. In step S85, the decoding of the transport stream starts.

In step S86, it is determined whether the currently displayed image is one corresponding to the PTS of the CM start point. If the decision is no, then, in step S87, the current image is displayed. The processing goes back to step S85 to repeat the subsequent operations mentioned above. If the decision is yes in step S86, then, in step S88, the decoding and the displaying of the image are stopped.

In step S89, from the packet number at which the STC time axis of CM end point and the PTS of the CM end point, the source packet number having an entry point which is nearest to and temporally before the PTS of the end point is obtained. In step S90, the data of the transport stream are read from the source packet number obtained in step S89 and supplied to the AV decoder 47. In step S91, the AV decoder 47 restarts the display beginning with the picture corresponding to the PTS of the CM end point.

The following specifically describes a CM skip operation shown in FIGS. 25A through 25C for example. It is assumed that CM start point and CM end point be on the STC time axis with the same STC_sequence id being id0 and the source packet number at which the STC time axis starts be smaller than A.

If the display time becomes PTS (a0) in step S86 when the transport stream is being decoded, the decoding and the displaying are stopped. Then, if PTS(C)<PTS (c0) for example, decoding starts with a stream which begins with the data having packet number C in step S90. In step S91, the displaying restarts with a picture corresponding to PTS (c0).

The following describes a method of using ProgramInfo at the time of reproduction. It is effective for the reproduction system to know the information about the program content included in the stream, namely the PID of the packet transmitting a video or audio elementary stream and a video or audio component type (for example, HDTV video stream or MPEG2 AAC audio stream) before the DVR transport stream is reproduced.

These pieces of information are helpful in creating a menu screen for describing the contents of the recorded transport stream to the user or initializing the AV decoder 47 and the demultiplexer 46 before decoding the stream.

The program content may change as shown in FIG. 18 halfway in the transport stream to be recorded. For example, it is possible that the PID of the packet for transmitting a video stream changes or the contents of the video stream change from SDTV to HDTV. ProgramInfo stores an address (a source packet number) at which program contents change halfway in the stream. When a reproduction start time is specified, the reproduction system checks the source packet number at which the reading starts and can know the program content stored at that address from ProgramInfo in advance.

As described, in the reproduction processing, reproduction starts with the entry point (I picture position) described in the entry point map included in the stream database, thereby controlling the reading positions easily and quickly.

In the present embodiment, the configurations of the recording apparatus 10 and the reproducing apparatus 40 are shown separately. It will be apparent that the recording apparatus 10 and the reproducing apparatus 40 may be combined into one apparatus.

It should be noted that the above-mentioned sequence of processing operations may be executed by not only hardware but also software. To execute the above-mentioned sequence of processing operations by software, the programs constituting that software are installed from a recording medium into a computer built in dedicated hardware or into a general-purpose personal computer capable of executing various functions.

Figure 2:
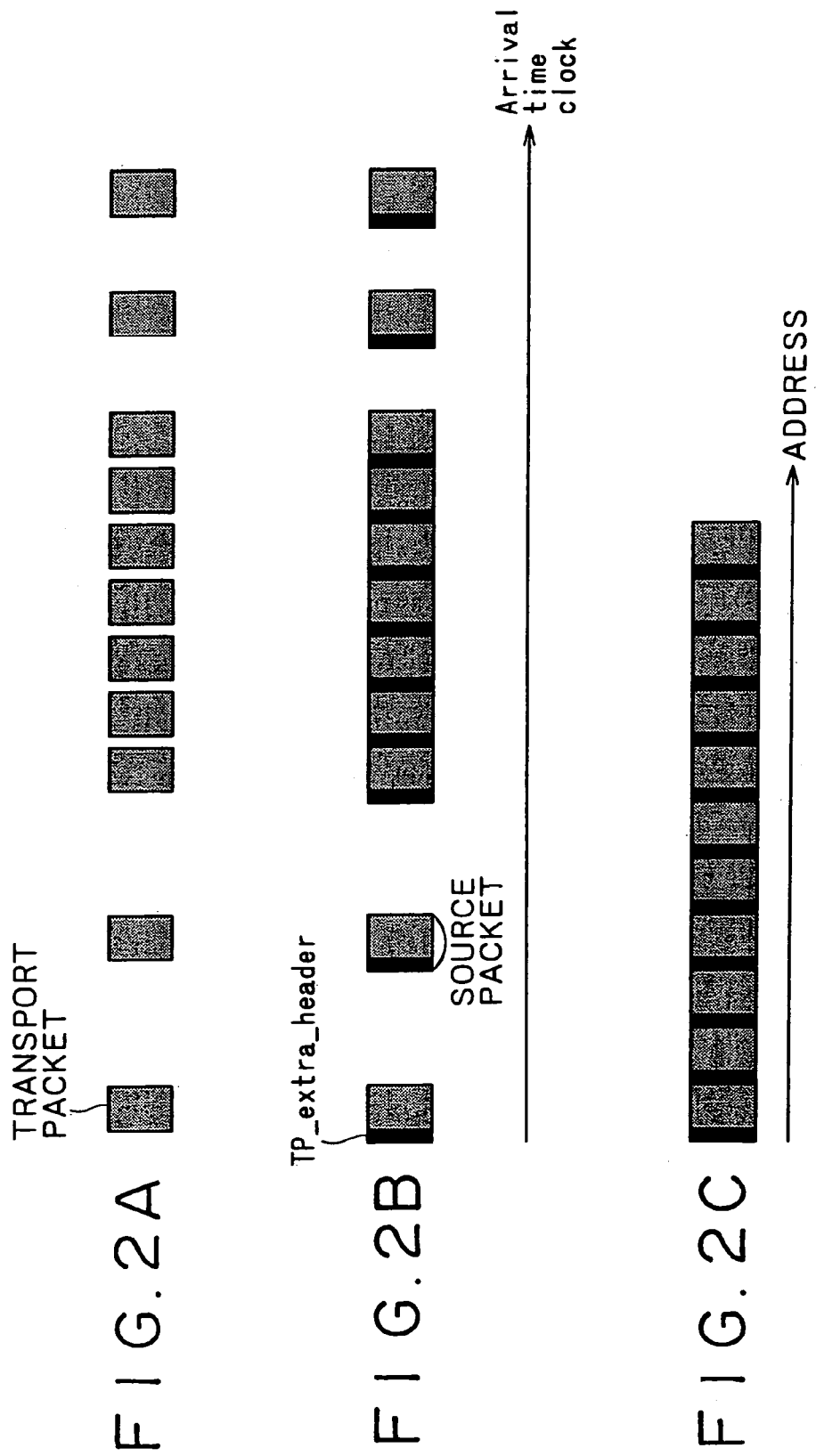
FIGS. 2A, 2B, and 2C illustrate a DVR transport packet to be recorded on a data recording medium.

This recording medium is constituted by not only a package medium made up of the magnetic disc 24 (including a floppy disc), the optical disc 25 (including a CD-ROM (Compact Disc Read Only Memory) and a DVD (Digital Versatile Disc), the magneto-optical disc 26 (including an MD (Mini Disc), or the semiconductor memory 27 shown in FIG. 1 which is distributed to provide programs to users separately from a computer, but also a computer-incorporated ROM hard disc in which programs are stored for provision to users.

It should be noted that, in the present specification, the steps for describing the program to be recorded in a recording medium include not only the processing operations to be executed sequentially in time but also the processing operations to be executed in parallel or discretely.

It should also be noted that, in the present specification, a system denotes an apparatus in its entirety consisting of two or more devices.

As described and according to the transport stream recording apparatus and method and the program stored in the first program recording medium associated with the invention, discontinuity point information is recorded on a data recording medium as a database corresponding to a transport stream. This novel constitution allows the recording of transport streams so that prompt random access reproduction in response to user commands is realized.

In addition, according to the transport stream recording apparatus and method and the program stored in the second program recording medium associated with the invention, the reading of transport packets is started by use of a database corresponding to a transport stream. This novel constitution also realizes prompt random access reproduction in response to user commands.

While the preferred embodiments of the present invention have been described using specific terms, such description is for illustrative purposes only, and it is to be understood that changes and variations may be made without departing from the spirit or scope of the appended claims.

What is claimed is:

1. A transport stream recording apparatus comprising:
   an input unit operable to input a transport packet constituting said transport stream;
   a generator operable to generate program sequence information indicative of a) an interval in which the number of video and/or audio elementary streams in said transport stream does not change or b) an interval in which a coding attribute of each video and/or audio stream in said transport stream does not change;
   a first analyzer configured to extract, from said transport packets, a transport packet including entry point data that indicate a packet in which I picture data provide a reproduction start position;
   an entry point map generator configured to generate an entry point map for identifying said transport packet including said entry point data by describing a packet number information identifying the position of the entry point, for a random access operation of the transport stream; and
   a recording unit operable to record said program sequence information and said entry point map along with said transport stream, on a recording medium, as a database corresponding to said transport stream.

2. A transport stream recording apparatus according to claim 1, wherein said generator generates program sequence information indicative of the sequence of transport packets that includes no PCR PID discontinuity.

3. A transport stream recording apparatus according to claim 1, wherein said coding attribute includes video frame frequency.

4. A transport stream recording apparatus according to claim 1, wherein said coding attribute includes aspect ratio.

5. A transport stream recording apparatus according to claim 1, wherein said coding attribute includes audio coding method.

6. A transport stream recording apparatus according to claim 1, wherein said coding attribute includes audio component type.

7. A transport stream recording apparatus according to claim 1, wherein said coding attribute includes sampling frequency.

8. A transport stream recording apparatus according to claim 1, wherein
   said entry point map generator generates said entry point map by use of positional information of said transport packet including said I picture data and time information of said I picture.

9. A transport stream recording method, comprising:
   receiving a transport packet constituting said transport stream, by an input unit;
   generating program sequence information indicative of a) an interval in which the number of video and/or audio elementary streams in said transport stream does not change or b) an interval in which a coding attribute of each video and/or audio stream in said transport stream does not change, by a first generator;
   analyzing to extract, from said transport packets, a transport packet including entry point data that indicate a packet in which I picture data provide a reproduction start position, by an analyzer;
   generating an entry point map for identifying said transport packet including said data by describing a packet number information identifying the position of the entry point, by a second generator, for a random access operation of the transport stream; and
   recording said program sequence information along with said transport stream.

10. A computer readable storage medium including computer executable code embedded in the computer readable storage medium for performing a method for recording a transport stream, the computer program code performing:
   receiving a transport packet by an input unit, said transport stream including said transport packet;
   generating program sequence information indicative of a) an interval in which the number of video and/or audio elementary streams in said transport stream does not change or b) an interval in which a coding attribute of each video and/or audio stream in said transport stream does not change, by a first generator;
   analyzing to extract, from said transport packets, a transport packet including entry data that indicate a packet in which I picture data provide a reproduction start position, by an analyzer;
   generating an entry point map for identifying said transport packet including said entry point data by describing a packet number information identifying the position of the entry point, by a second generator, for a random access operation of the transport stream; and recording said program sequence information along with said transport stream.

11. A transport stream reproducing apparatus for reproducing a transport stream recorded on a recording medium, comprising:
- a reproducing unit operable to reproduce said transport stream, program sequence information, and an entry point map from said recording medium, said transport stream including a sequence of transport packets, said program sequence information indicating the sequence of transport packets that includes no program attribute discontinuity,. and said entry point map identifying the position of the entry point by including entry point data that indicate a packet in which I picture data provide a reproduction start position, and by describing a packet number information identifying the position of the entry point, for a random access operation of the transport stream;
- a processor operable to generate an output signal to be presented; and
- a controller operable to control the processor on the basis of the program sequence information and the entry point map.

12. A transport stream reproducing method for reproducing a transport stream recorded on a recording medium, comprising:
- reproducing said transport stream, program sequence information, and entry point map from said recording medium, said transport stream including a sequence of transport packets, said program sequence information indicating the sequence of transport packets that includes no program attribute discontinuity, and said entry point map identifying the position of the entry point by including entry point data that indicate a packet in which I picture data provide a reproduction start position, and by describing a packet number information identifying the position of the entry point, for a random access operation of the transport stream, by a reproducing unit;
- generating an output signal to be presented, by a generator; and
- controlling the generating on the basis of the program sequence information and the entry point map, by a controller.

* * * * *